(12) United States Patent
Tomiyama et al.

(10) Patent No.: US 9,304,384 B2
(45) Date of Patent: Apr. 5, 2016

(54) PROJECTION DISPLAY APPARATUS AND PROJECTION LIGHT GENERATING METHOD

(71) Applicant: NEC Corporation, Minato-ku, Tokyo (JP)

(72) Inventors: Mizuho Tomiyama, Tokyo (JP); Naofumi Suzuki, Tokyo (JP); Masao Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/418,133

(22) PCT Filed: Jul. 30, 2013

(86) PCT No.: PCT/JP2013/004595
§ 371 (c)(1),
(2) Date: Jan. 29, 2015

(87) PCT Pub. No.: WO2014/020894
PCT Pub. Date: Feb. 6, 2014

(65) Prior Publication Data
US 2015/0261078 A1   Sep. 17, 2015

(30) Foreign Application Priority Data

Aug. 2, 2012 (JP) ................................ 2012-172192

(51) Int. Cl.
| H04N 9/31 | (2006.01) |
|---|---|
| G02B 27/10 | (2006.01) |
| G03B 21/20 | (2006.01) |
| G02B 27/14 | (2006.01) |
| G02B 27/28 | (2006.01) |
| G03B 33/12 | (2006.01) |

(52) U.S. Cl.
CPC ........ *G03B 21/2073* (2013.01); *G02B 27/1006* (2013.01); *G02B 27/1026* (2013.01);
(Continued)

(58) Field of Classification Search
CPC .. G03B 21/14; G03B 27/1026; G03B 27/283; H04N 9/31; H04N 9/3164; H04N 9/3167; H04N 9/3102; H04N 9/3105; G02B 27/10; G02B 27/1006; G02B 27/141; G02B 27/145
USPC ........... 353/20, 31, 34, 37, 84; 349/5, 7, 8, 9; 359/634; 362/230, 231

See application file for complete search history.

(56) References Cited

U.S. PATENT DOCUMENTS 5,648,870 A * 7/1997 Mistutake ................ 359/487.05
6,628,346 B1 * 9/2003 Ebiko .............................. 349/9
(Continued)

FOREIGN PATENT DOCUMENTS

| JP | 2004-325477 A | 11/2004 |
| JP | 2005-321524 A | 11/2005 |

(Continued)

OTHER PUBLICATIONS

International Search Report for PCT Application No. PCT/JP2013/004595, mailed on Oct. 22, 2013.

*Primary Examiner* — William C Dowling

(57) ABSTRACT

A first light source that emits first light of a first wavelength band; an optical path separator that separates the first light into fourth light and fifth light having different optical paths from each other; and a first optical path combiner that combines the fourth light and the fifth light are included, where the fourth light includes light of a fourth wavelength band being a predetermined band in the first wavelength band and light having a polarization component in a first direction being a predetermined polarization direction in a fifth wavelength band being a band other than the fourth wavelength band in the first wavelength band, and the fifth light is light having a polarization component in a second direction orthogonal to the first direction in the fifth wavelength band.

16 Claims, 19 Drawing Sheets

(52) U.S. Cl.
CPC ............ *G02B27/141* (2013.01); *G02B 27/283* (2013.01); *G03B 21/204* (2013.01); *G03B 21/2033* (2013.01); *G03B 21/2066* (2013.01); *G03B 33/12* (2013.01); *H04N 9/3102* (2013.01); *H04N 9/3105* (2013.01)

(56) References Cited

U.S. PATENT DOCUMENTS

| | | | |
|---|---|---|---|
| 7,413,310 B2 * | 8/2008 | Heine | 353/31 |
| 7,621,642 B2 * | 11/2009 | Yamamoto | 353/20 |
| 8,358,462 B2 * | 1/2013 | Jacobsen et al. | 359/367 |
| 2014/0160364 A1 * | 6/2014 | Katou | 349/5 |
| 2015/0160542 A1 * | 6/2015 | Tomiyama et al. | 353/31 |

FOREIGN PATENT DOCUMENTS

| | | |
|---|---|---|
| JP | 2006-317739 A | 11/2006 |
| JP | 2007-065412 A | 3/2007 |
| WO | 2011/037014 A1 | 3/2011 |
| WO | 2012/086011 A1 | 6/2012 |
| WO | 2013/014794 A1 | 1/2013 |

* cited by examiner

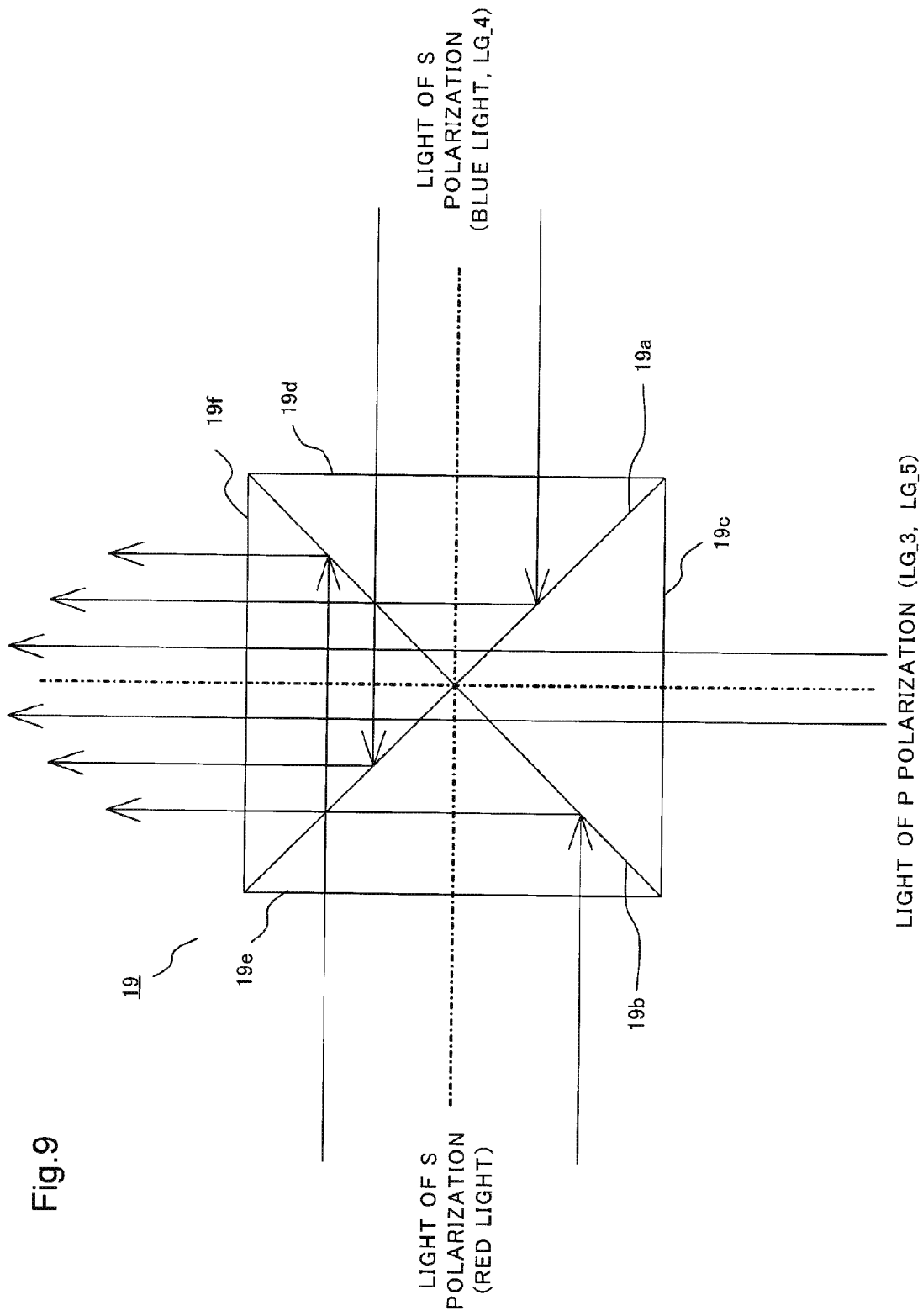

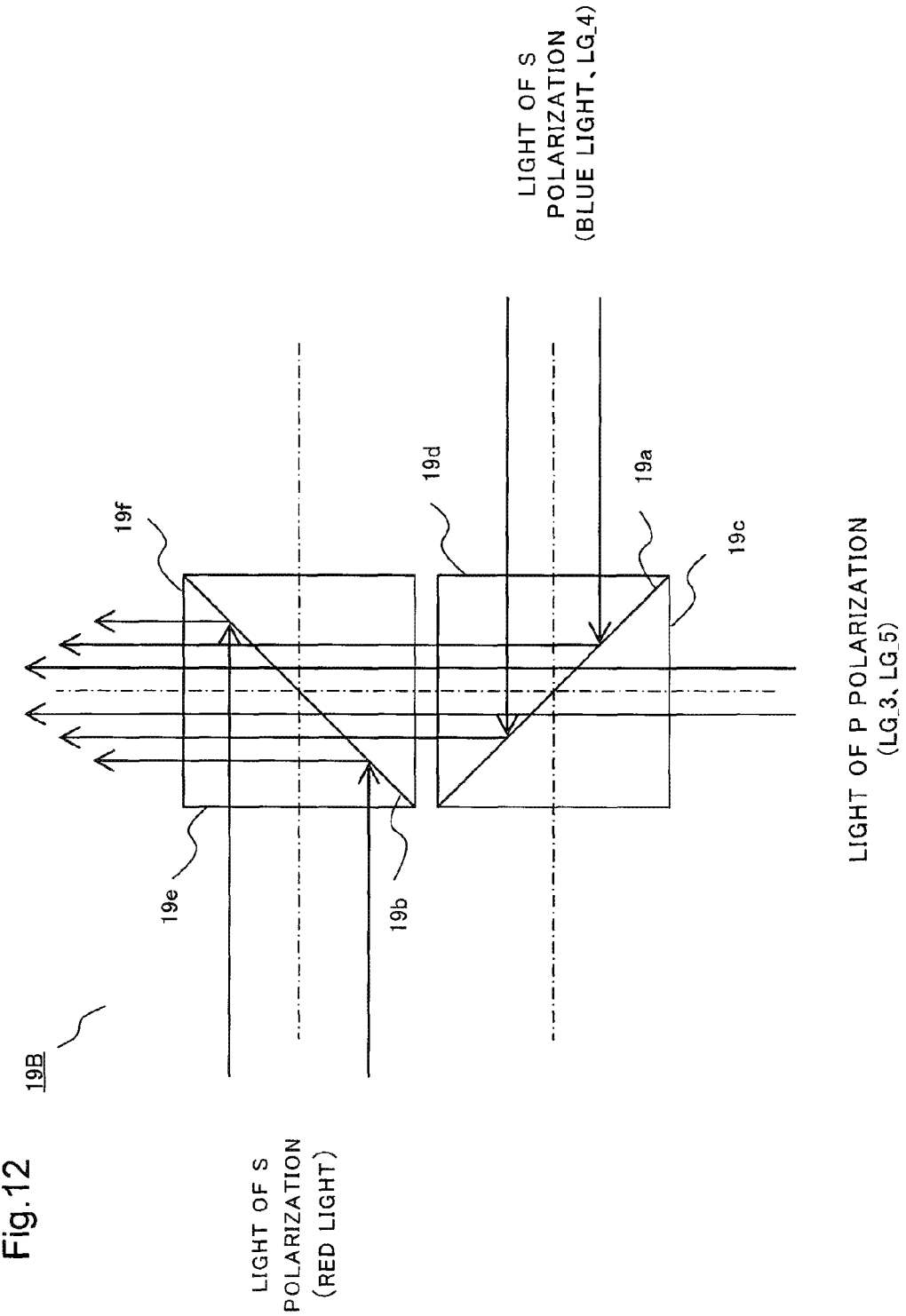

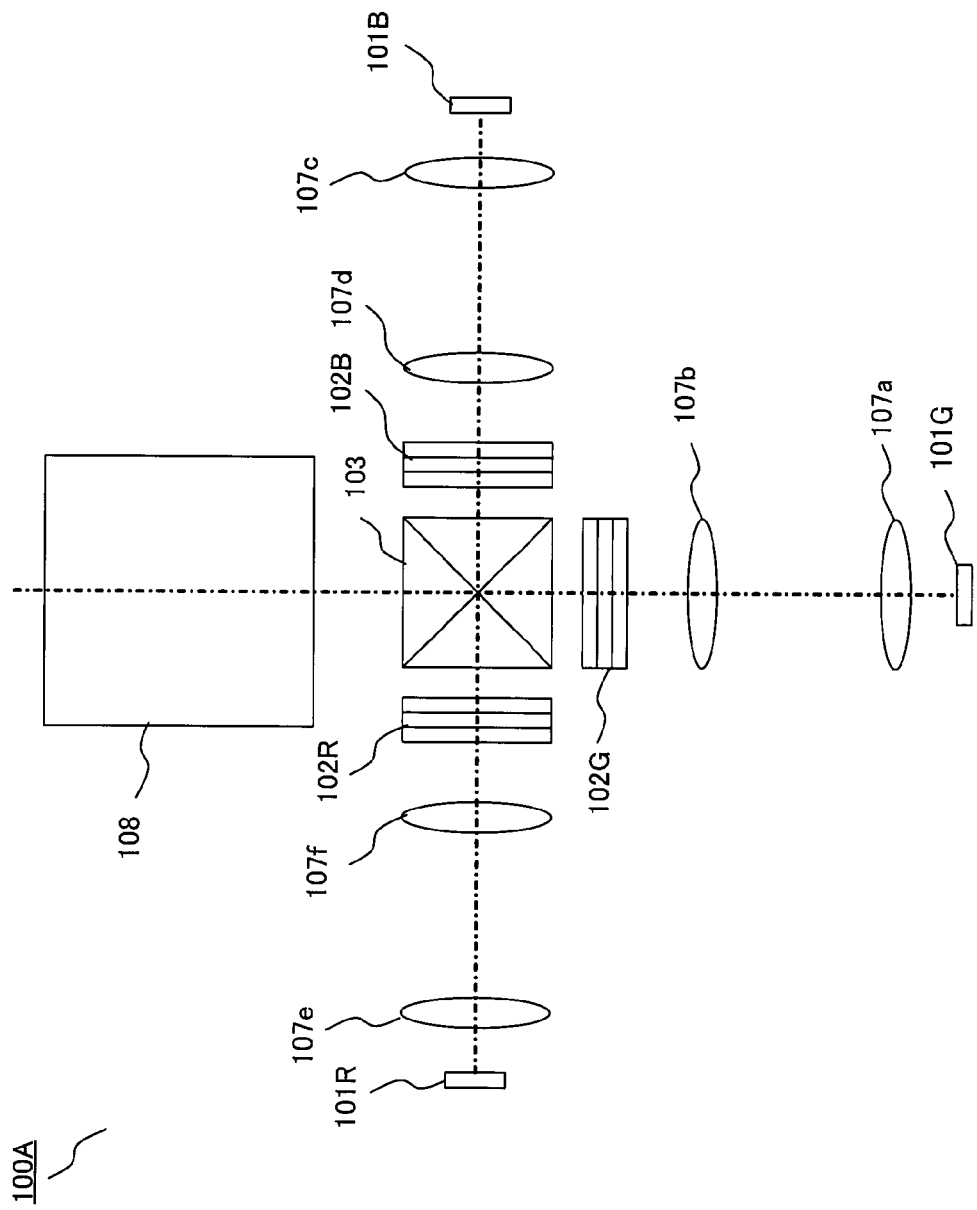

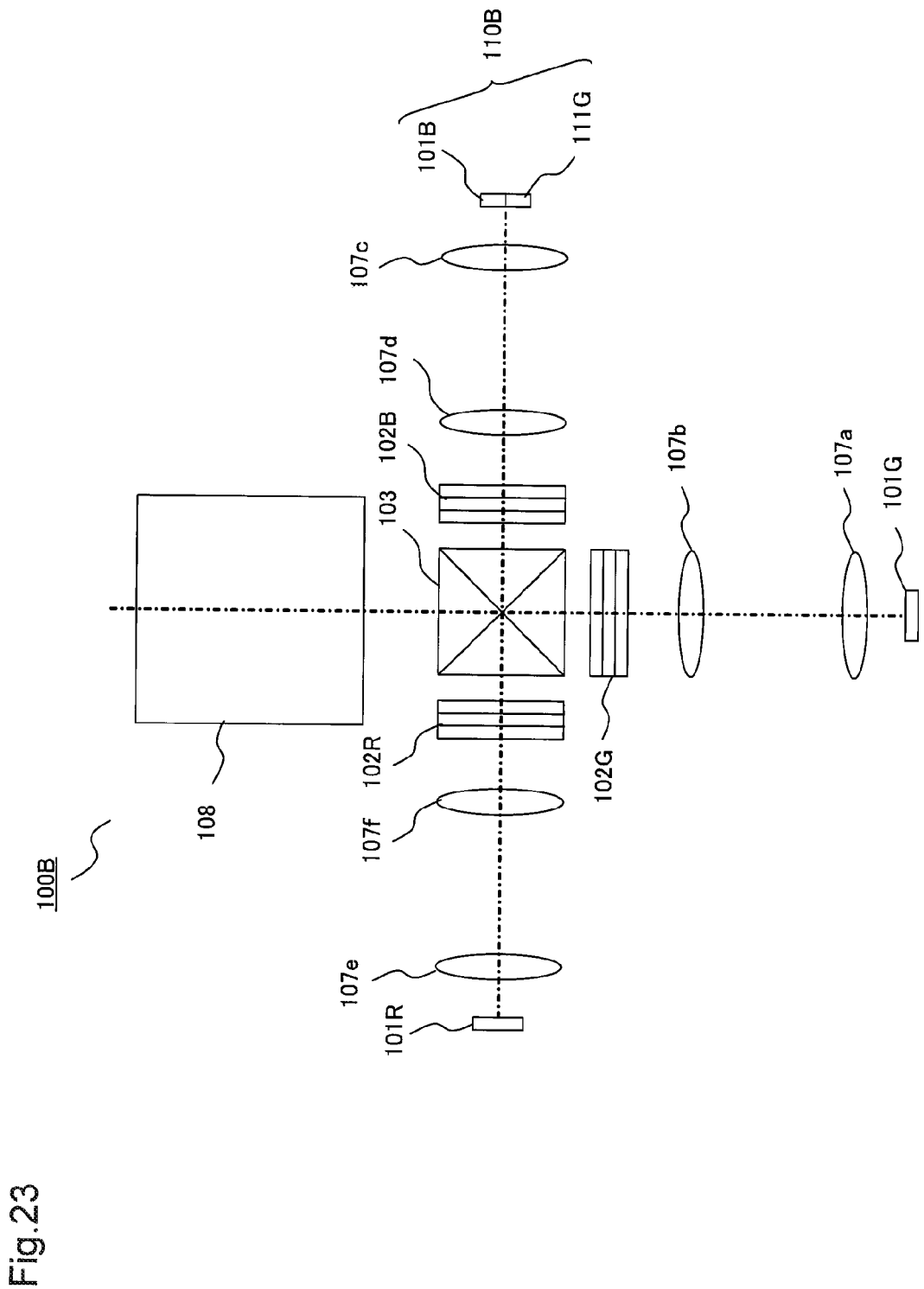

PROJECTION DISPLAY APPARATUS AND PROJECTION LIGHT GENERATING METHOD

This application is a National Stage Entry of PCT/JP2013/004595 filed on Jul. 30, 2013, which claims priority from Japanese Patent Application 2012-172192 filed on Aug. 2, 2012, the contents of all of which are incorporated herein by reference, in their entirety.

TECHNICAL FIELD

The present invention relates to a projection display apparatus and a projection light generating method.

BACKGROUND ART

Light sources having high brightness, low consumption power, and long life are desired in projection display apparatuses represented by projectors. Some exemplary light sources satisfying such requests are light emitting diodes (LED) and laser diodes (LD).

FIG. 22 is a block diagram of a projection display apparatus 100A which utilizes LED as a light source. Light rays emitted from a green LED 101G, a blue LED 101B, and a red LED 101R are respectively transmitted through lenses 107a-107f, light modulators 102G, 102B, and 102R. Thereafter, respective light rays are combined by a cross dichroic prism 103, incident on a projection lens 108, and then projected onto a screen or the like (not illustrated in the drawing) from the projection lens 108.

Note that light modulators 102G, 102B, and 102R include polarizers, liquid crystal cells and analyzers, and spatially modulate and emit light incident thereon.

The cross dichroic prism 103 includes a dichroic film reflecting only light in a blue wavelength band, and a dichroic film reflecting only light in a red wavelength band. Then, the green light, the blue light, and the red light incident on the cross dichroic prism 103 from the three directions are combined, and projected onto the projection lens 108.

Such an LED is made of a semiconductor, and can emit blue light by using an InGaN-based semiconductor material and red light by using an AlGaInP-based semiconductor material. However, an LED emitting green light formed by using InGaN-based and AlGaInP-based semiconductor materials suffers a problem of having low light emitting efficiency. This problem is called "green gap."

A light source combining LED or LD light sources with a phosphor light source has been proposed as a method to solve the lack in light quantity of green light related to this green gap. As an example of a light source using a phosphor, a configuration in which a blue LED and a phosphor are combined has been known (so-called "phosphor LED"). In this configuration, the blue light emitted from the blue LED is used as excitation light which helps the phosphor generate green light.

The blue LED used as an excitation light source has a larger output than the green LED does. Therefore, by using a phosphor LED, it is possible to obtain green light of higher brightness than that of green light emitted from a green LED.

On the other hand, Patent Literature 1 discloses a method to emit green light of high brightness using a plurality of green LEDs. FIG. 23 shows a configuration of the projection display apparatus 100B described in Patent Literature 1.

This projection display apparatus 100B includes a green LED 101G, a combined LED 110B, and a red LED 101R. Note that the combined LED 110B includes a blue LED 101B and a green LED 111G. The combined LED 110B emits light in which blue light and green light are combined.

Light rays respectively emitted from LEDs are transmitted through lenses 107a-107f, light modulators 102G, 102B, and 102R, and incident on a cross dichroic prism 103.

The cross dichroic prism 103 has wavelength dependence and polarization dependence, and combines green light, blue light, and red light, as well as uses polarization to combine green light emitted from the green LED 101G and green light emitted from the green LED 111G of the combined LED 110B.

By emitting blue light and green light from the combined LED 110B, the intensity of green light emitted from the projection lens 108 can be increased.

Note that as a method to further increase the intensity of green light, it is possible to use a phosphor LED in the projection display apparatus of Patent Literature 1.

CITATION LIST

Patent Literature

PTL 1: WO 2011/037014 A1

SUMMARY OF INVENTION

Technical Problem

However, the spectral distribution of the green light source resulting when a phosphor LED is combined in the projection display apparatus of Patent Literature 1 will be wider than the spectral distribution for a green LED, and so overlaps with the spectrums of blue light and red light, which causes the following problem. That is, when the spectral distribution of the green light source overlaps with the spectral distribution of blue light or red light, the light rays in the wavelength bands whose spectrums are overlapped cannot be efficiently combined in the cross dichroic prism, which degrades the light utilization efficiency of the projection display apparatus.

In addition, because using a combined LED, the projection display apparatus of Patent Literature 1 suffers decreased intensity of blue light, despite the intensity improvement of green light.

In view of the above, an object of the present invention is to provide a projection display apparatus that uses a light source including a phosphor or the like having a wide spectral distribution as well as has improved light utilization efficiency by restraining intensity reduction of blue light and red light, and a projection light generating method.

Solution to Problem

So as to solve the above-mentioned problem, a projection display apparatus generating and projecting light of a plurality of wavelength bands, is characterized by including: a first light source that emits first light of a first wavelength band; an optical path separator that separates the first light into fourth light and fifth light having different optical paths from each other; and a first optical path combiner that combines the fourth light and the fifth light, where the fourth light includes light of a fourth wavelength band being a predetermined band in the first wavelength band and light having a polarization component in a first direction being a predetermined polarization direction in a fifth wavelength band being a band other than the fourth wavelength band in the first wavelength band, and the fifth light is light having a polarization component in a second direction orthogonal to the first direction in the fifth wavelength band.

A projection light generating method generating and projecting light of a plurality of wavelength bands, is characterized by including: emitting first light of a first wavelength band by a first light source; separating the first light into fourth light and fifth light having different optical paths from each other, by an optical path separator; and combining the fourth light and the fifth light, by a first optical path combiner, where the fourth light includes light of a fourth wavelength band being a predetermined band in the first wavelength band and light having a polarization component in a first direction being a predetermined polarization direction in a fifth wavelength band being a band other than the fourth wavelength band in the first wavelength band, and the fifth light is light having a polarization component in a second direction orthogonal to the first direction in the fifth wavelength band.

Advantageous Effects of Invention

The present invention combines a part of green light with blue light, thereby enabling to improve the intensity of green light without degrading the intensity of blue light, as well as enabling to improve the light utilization efficiency when combining green light with blue light or red light, even when a light source having a wide spectral distribution is used as a green light source.

BRIEF DESCRIPTION OF DRAWINGS

FIG. 9 is a top view of a first optical path combiner.

FIG. 12 is a top view of a first optical path combiner.

FIG. 13 is a flowchart explaining the transmission state of light transmitted through each element such as an optical path separator, a light modulator, or the like.

FIG. 14 is a flowchart explaining the transmission state of light transmitted through each element such as an optical path separator, a light modulator, or the like.

FIG. 22 is a block diagram of a projection display apparatus used to explain a related art.

FIG. 23 is another block diagram of a projection display apparatus used to explain a related art.

DESCRIPTION OF EMBODIMENTS

First Exemplary Embodiment

The first exemplary embodiment of the present invention is described. Note that the projection display apparatus according to the present exemplary embodiment uses a green light source emitting green light, a blue light source emitting blue light, and a red light source emitting red light as detailed later. Please note that, although it is possible to associate the first light source, the second light source, and the third light source in the claims, with the green light source, the blue light source, and the red light source, respectively, the present invention is not limited to such correspondence relation. Therefore, the first light source may be associated with the red light source, for example. When the first light source is associated with the green light source, the first light is green light. When the first light source is associated with the red light source, the first light is red light. In addition, the wavelength band of the emitted light also depends on the color of the light source. The following explanation assumes that the first light source is a green light source, the second light source is a blue light source, and the third light source is a red light source.

Also in the following explanation, a specific polarization direction of light is assumed. However, the present invention is not limited to the specific polarization direction. In other words, although the following explanation assumes that light having a polarization component in the first direction is S polarization, and light having a polarization component in the second direction is P polarization, the present invention can also be applied to cases in which the S polarization and the P polarization are switched with each other.

Figure 1:
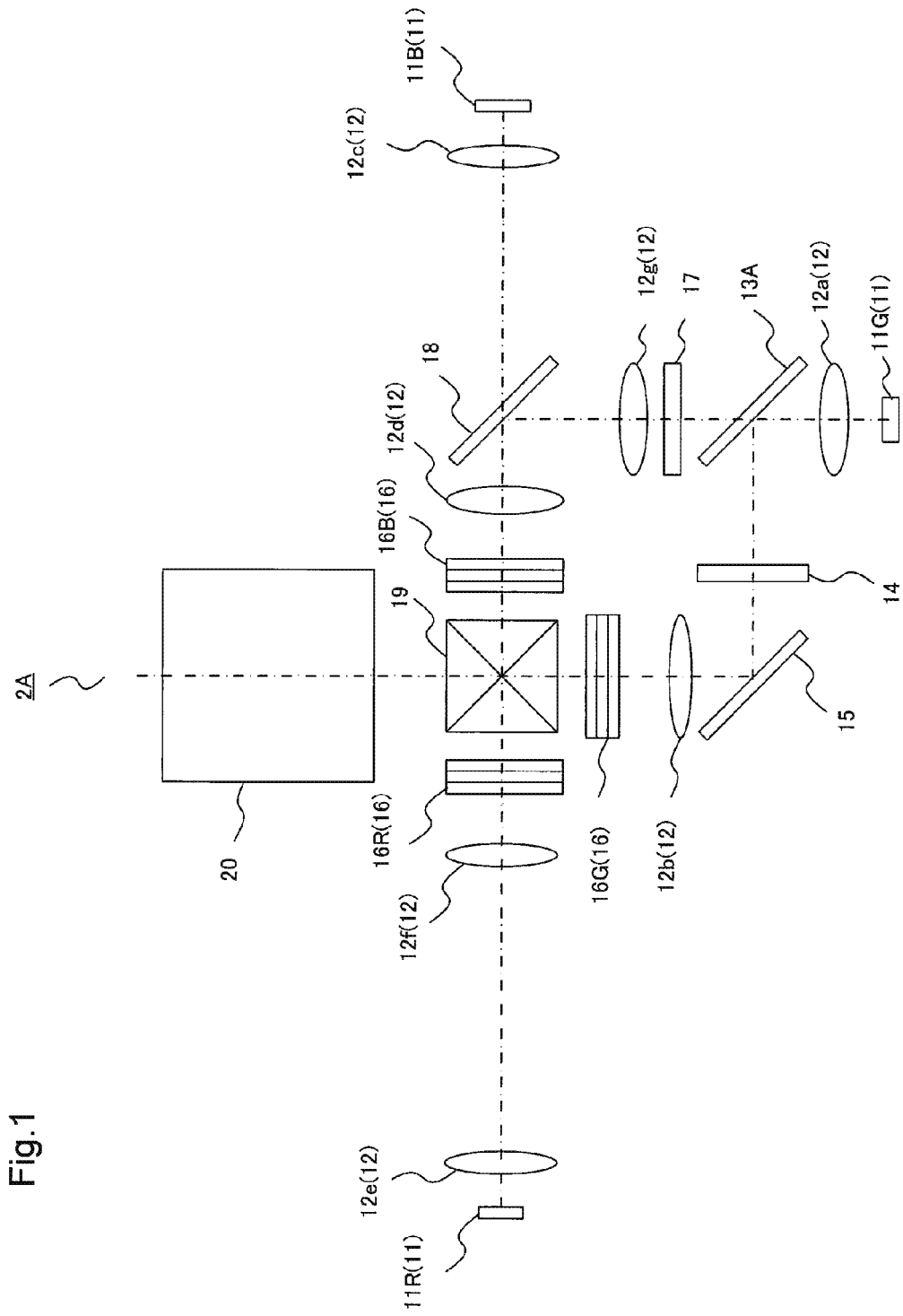
FIG. 1 is a block diagram of a projection display apparatus according to a first exemplary embodiment of the present invention.
Figure 2:
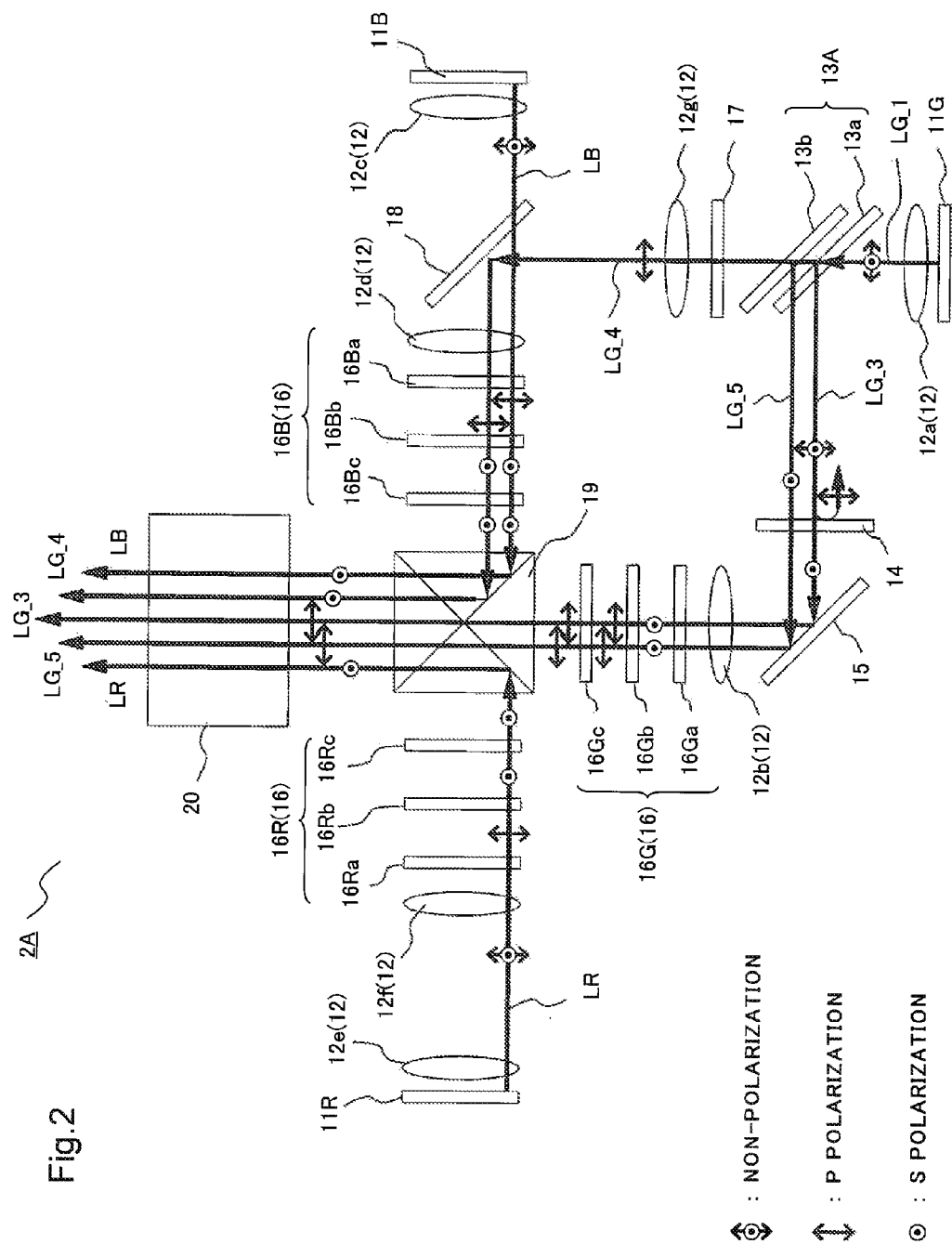
FIG. 2 is a block diagram of the block diagram of FIG. 1 to which a polarization state of light transmitted through an optical path or the like is added.

FIG. 1 is a block diagram of a projection display apparatus 2A according to the present exemplary embodiment, and FIG. 2 is a block diagram in which the polarization state and propagation direction of light transmitted through an optical path are added to FIG. 1.

The projection display apparatus 2A includes a light source 11, a lens 12, an optical path separator 13A, a polarizer 14, a mirror 15, a light modulator 16, a shutter (first blocker) 17, a second optical path combiner 18, a first optical path combiner 19, and a projection lens 20.

The light source 11 includes a green light source (first light source) 11G emitting green light (first light), a blue light source (second light source) 11B emitting blue light (fourth light), and a red light source (third light source) 11R emitting red light (fifth light). As such a light source 11, a surface-light-emitting type solid state light source such as LED or a surface-light-emitting laser, or a surface-light-emitting device made of a light source and a light guide plate can be adopted.

Note that a light source made up of at least an excitation light source and a phosphor can be used as the green light source 11G. As the excitation light source, LED or LD emitting light in any wavelength band from among the wavelength bands from violet to blue is used. As the phosphor, a phosphor material itself, a phosphor material dispersed in a transparent material, or a phosphor material stacked on a transparent material may be used. The excitation light source and the phosphor may be provided in close contact with each other, or with a gap therebetween. It is also possible to provide, in the gap, a lens, a light guide, others such as an optical element made of a transparent material, or a mirror. Also for the blue light source 11B and the red light source 11R, LED or LD is used, and may include such optical elements as a lens or a light guide as a constituting element. The following explanation assumes that the green light source 11G is a phosphor LED in which phosphors are densely packed, the blue light source 11B is a blue LED, and the red light source 11R is a red LED.

Figure 3:
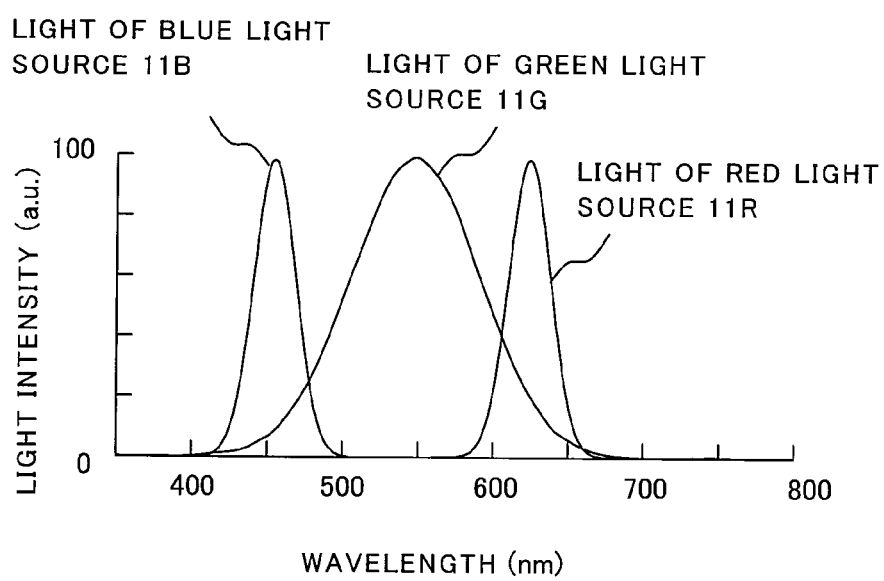
FIG. 3 is a spectral distribution diagram of light rays emitted from respective light sources.

FIG. 3 is a spectral distribution diagram of light rays emitted from respective light sources 11. The blue light emitted from the blue light source 11B has its peak in light intensity in the wavelength band of 400 nm-500 nm (second wavelength band). The green light emitted from the green light source 11G has its peak in light intensity in the wavelength band of 500 nm-600 nm (first wavelength band). The red light emitted from the red light source 11R has its peak in light intensity in the wavelength band of 600 nm-700 nm (third wavelength band). The spectral distribution of the green light emitted from the green light source 11G is partially overlapped with the spectral distributions of the light rays emitted from the blue light source 11B and the red light source 11R.

The lens 12 either collects or diverges incident light and emits it.

The optical path separator 13A separates and emits incident light in the directions of the mirror 15 and the second optical path combiner 18 according to the wavelength band and the polarization direction.

Figure 4:
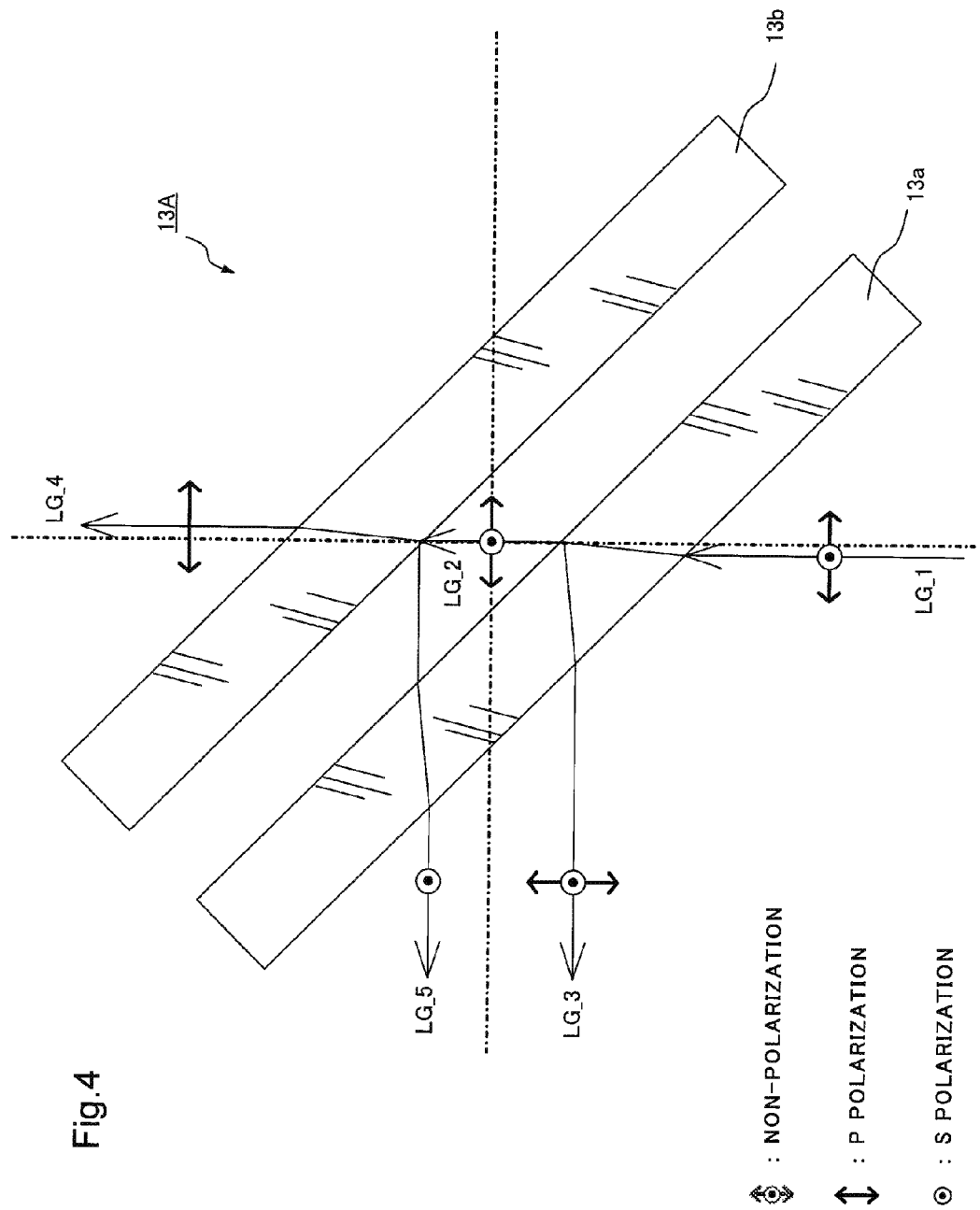
FIG. 4 is a block diagram of an optical path separator.

FIG. 4 is a block diagram of the optical path separator 13A. The optical path separator 13A is made up of a bandpass filter (wavelength separator) 13a and a polarizer (first polarized light separator) 13b.

Figure 5:
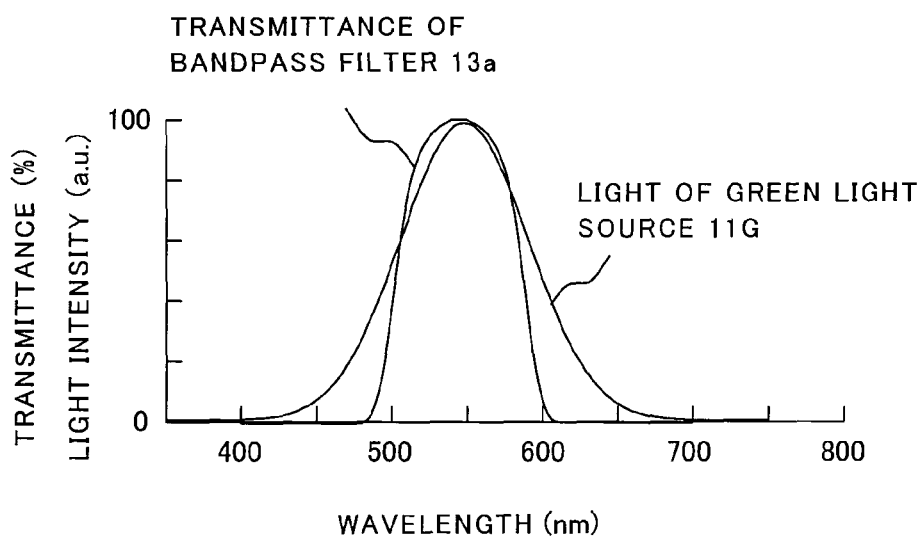
FIG. 5 shows wavelength dependence of the transmittance of a bandpass filter and a spectral distribution diagram of a green light source.

FIG. 5 shows wavelength dependence of the transmittance of a bandpass filter 13a and a spectral distribution diagram of light emitted from a green light source 11G. The bandpass filter 13a has a characteristic that transmits light having a wavelength band in the vicinity of 550 nm (fifth wavelength band) and reflects light of the other wavelength band (fourth wavelength band). The transmitted wavelength band is set to be narrower than the spectral distribution of the green light source 11G. The polarizer 13b has a characteristic that transmits light of a P polarization component (polarization component in second direction) and reflects light of an S polarization component (polarization component in first direction).

Accordingly, as FIG. 4 shows, among the light LG_1 emitted from the green light source 11G and incident on the optical path separator 13A, light LG_2 in the vicinity of the wavelength of 550 nm transmits through the bandpass filter 13a. On the other hand, light LG_3 not in the vicinity of the wavelength of 550 nm (a part of the fourth light) is reflected at the bandpass filter 13a.

Among the light LG_2 transmitted through the bandpass filter 13a, light of P polarization LG_4 (fifth light) transmits through the polarizer 13b. On the other hand, light of S polarization LG_5 (a part of fourth light) of the light LG_2 is reflected at the polarizer 13b, transmits through the bandpass filter 13a again, and is emitted from the optical path separator 13A.

In this way, in the optical path separator 13A, of the incident light LG_1, unpolarized light LG_3 and light of S polarization LG_5 are reflected, and light of P polarization LG_4 is transmitted, thereby separating the incident light LG_1 into two rays of light.

Figure 6:
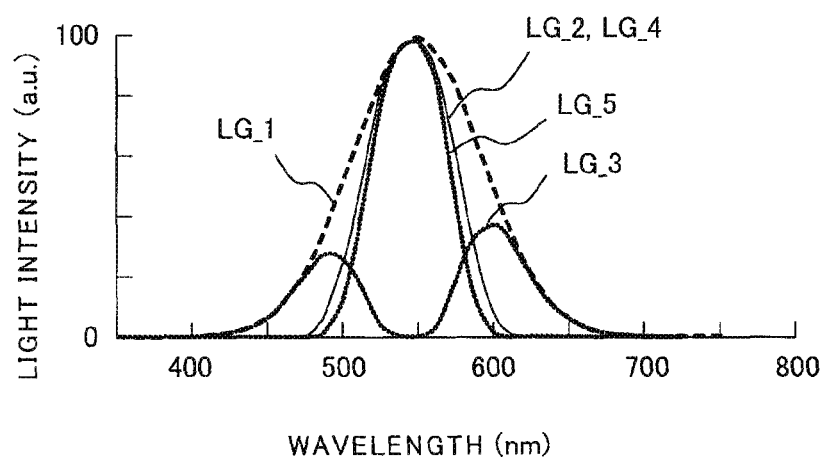
FIG. 6 is a spectral distribution diagram of incident light and emitted light of the optical path separator.

FIG. 6 is a spectral distribution diagram of the light LG_1 through the light LG_5. The light LG_1 is light emitted from the green light source 11G. The spectral distribution for the light LG_2 and the light LG_4 has a wavelength band narrower than that of the spectral distribution of the light LG_1, as well as having its peak in the vicinity of the wavelength of 550 nm, due to the transmission characteristic of the bandpass filter 13a.

The spectral distribution of the light LG_3 has degraded light intensity in the wavelength band in the vicinity of the wavelength of 550 nm, and has two peaks in the short wavelength side and in the long wavelength side, due to the reflection characteristic of the bandpass filter 13a. Because of passing the bandpass filter 13a twice, the spectral distribution of the light LG_5 has a wavelength band narrower than that of the light LG_2 and LG_4 having passed it once.

Note that when the spectral distribution of the green light source 11G is narrow, the wavelength dependence of the transmittance of the bandpass filter 13a is not necessarily set to transmit only light in the vicinity of the wavelength of 550 nm. In other words, when the region in which the light emission spectrum of the green light source 11G and the light emission spectrum of the red light source 11R overlap is small, the bandpass filter 13a may be set to also transmit the region in the wavelength side longer than 550 nm.

Also when the region in which the light emission spectrum of the green light source 11G and the light emission spectrum of the blue light source 11B overlap is small, the bandpass filter 13a may be set to also transmit the light in the wavelength side shorter than 550 nm.

The polarizer (second polarization separator) 14 reflects light of P polarization component (polarization component in second direction) and transmits light of an S polarization component (polarization component in first direction).

The mirror 15 reflects incident light.

The light modulator 16 includes a light modulator (first light modulator) 16G, a light modulator (second light modulator) 16B, a light modulator (third modulator) 16R, provided in correspondence with respective light sources 11 (11G, 11B, 11R). Each of the light modulators 16G, 16B, 16R spatially modulates incident light.

Figure 7:
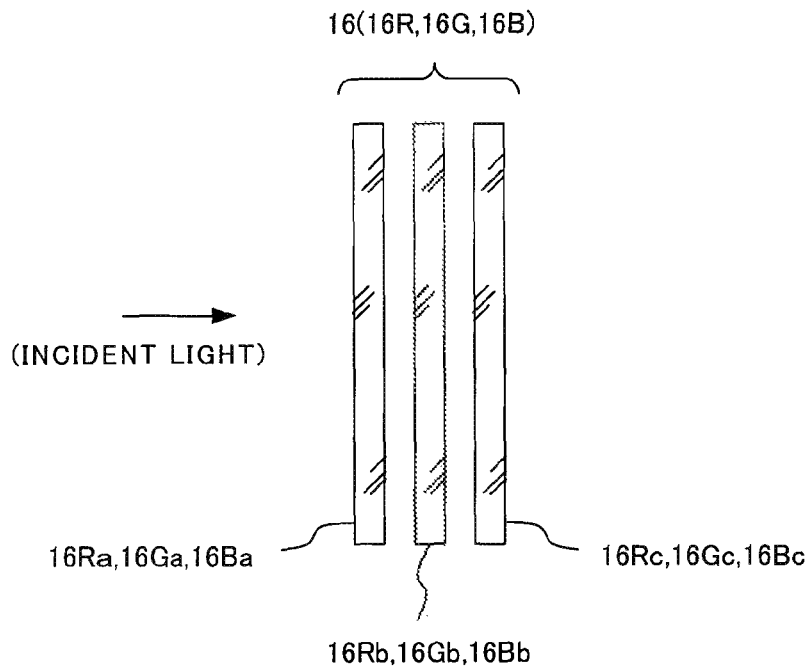
FIG. 7 is a block diagram of a light modulator.

FIG. 7 is a block diagram of the light modulator 16. The light modulators 16G, 16B, 16R are made up of polarizers 16Ga, 16Ba, 16Ra, liquid crystal cells 16Gb, 16Bb, 16Rb being polarization modulating elements, and analyzers 16Gc, 16Bc, 16Rc. Here, when the polarization component vertical to the paper is defined to be S polarization, and the polarization component parallel to the paper is defined to be P polarization, the polarizers 16Ba, 16Ra, and the analyzer 16Gc transmit only P polarization, and the polarizer 16Ga, and the analyzers 16Bc, 16Rc transmit only S polarization.

From among light incident from the polarizers 16Ga, 16Ba, 16Ra and whose polarization direction is rotated by being modulated by the liquid crystal cells 16Gb, 16Bb, 16Rb, the light of the polarization component that transmits through the analyzers 16Gc, 16Bc, 16Rc is emitted from the analyzers 16Gc, 16Bc 16Rc. Note that the polarization modulating element does not have to be a liquid crystal cell, and may be an element made of a material having an electro-optic effect such as PLZT(Lead Lanthanum Zirconate Titanate), SBN (Strontium Barium Niobate).

The shutter 17 includes an absorption plate and switches whether to transmit or absorb the incident light by taking in and out this absorption plate to the optical path. The shutter 17 may have a configuration of mechanically opening and closing the absorption plate.

The second optical path combiner 18 combines the light emitted from the green light source 11G (fifth light) and the light emitted from the blue light source 11B (second light) and emits the result. In an example, a dielectric multilayer film, a holographic element, a photonic crystal, or the like may be used as the second optical path combiner 18, which has a characteristic of transmitting light of a specific wavelength band and reflecting light of the other wavelength bands.

Figure 8:
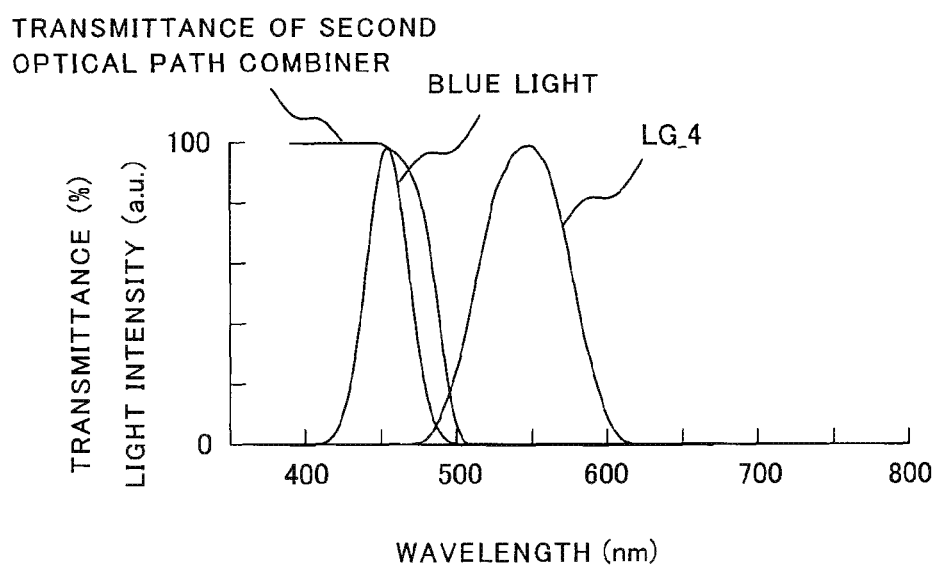
FIG. 8 is a diagram showing wavelength dependence of the transmittance in a second optical path combiner, as well as a spectral distribution of light emitted from a blue light source and a spectral distribution of light emitted from a green light source.

FIG. 8 is a diagram showing wavelength dependence of the transmittance in a second optical path combiner 18, as well as a spectral distribution of light emitted from a blue light source 11B (blue light) and a spectral distribution of light LG_4.

The region in which the spectral distributions of the blue light and the light LG_4 overlap is smaller than the region in which the spectral distributions of the light of the blue light source 11B and the light of the green light source 11G overlap illustrated in FIG. 3. Because of having a characteristic of transmitting the blue light and reflecting the light LG_4, the second optical path combiner 18 can combine the blue light and the light LG_4 almost without any loss.

The first optical path combiner 19 combines light rays incident from a plurality of directions, and emits them to the projection lens 20. A cross dichroic prism may be used as the first optical path combiner 19.

FIG. 9 is a top view of a first optical path combiner 19. The first optical path combiner 19 includes a dichroic film (first film) 19a and a dichroic film (second film) 19b provided to be orthogonal. The surface on which the light LG_3, LG_5 are incident forms a first incident surface 19c, the surface on which the light LG_4 and the blue light are incident forms a second incident surface 19d, and the surface on which the red light is incident forms a third incident surface 19e. The surface on which these incident light LG_3, LG_4, LG_5, blue light, red light are combined and emitted therefrom forms an emission surface 19f.

Figure 10A:
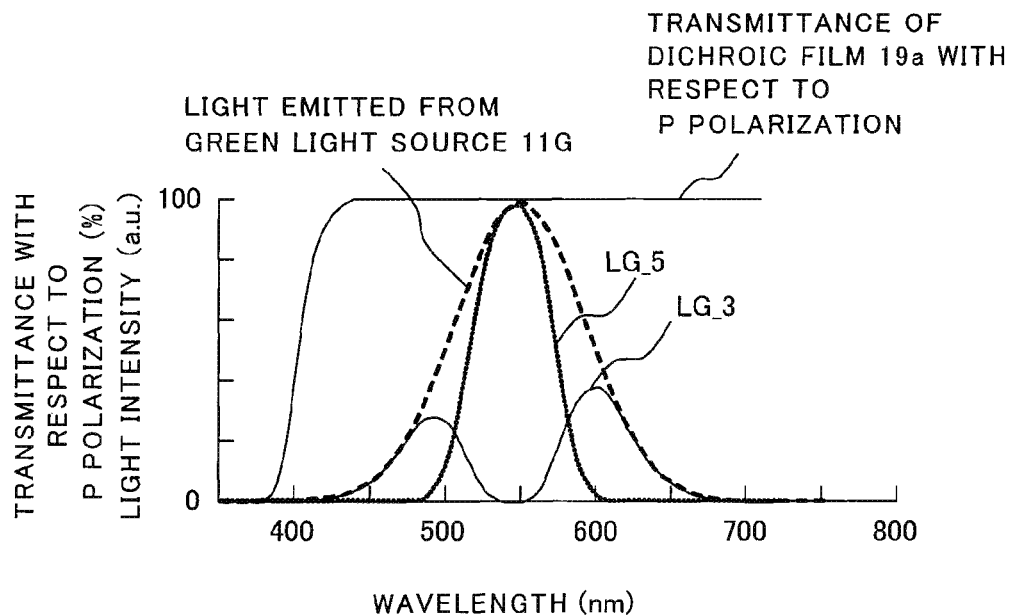
FIG. 10A shows wavelength dependence of the transmittance of a dichroic film and a characteristic diagram with respect to P polarized light showing the spectral distribution of light incident on the first optical path combiner.
Figure 10B:
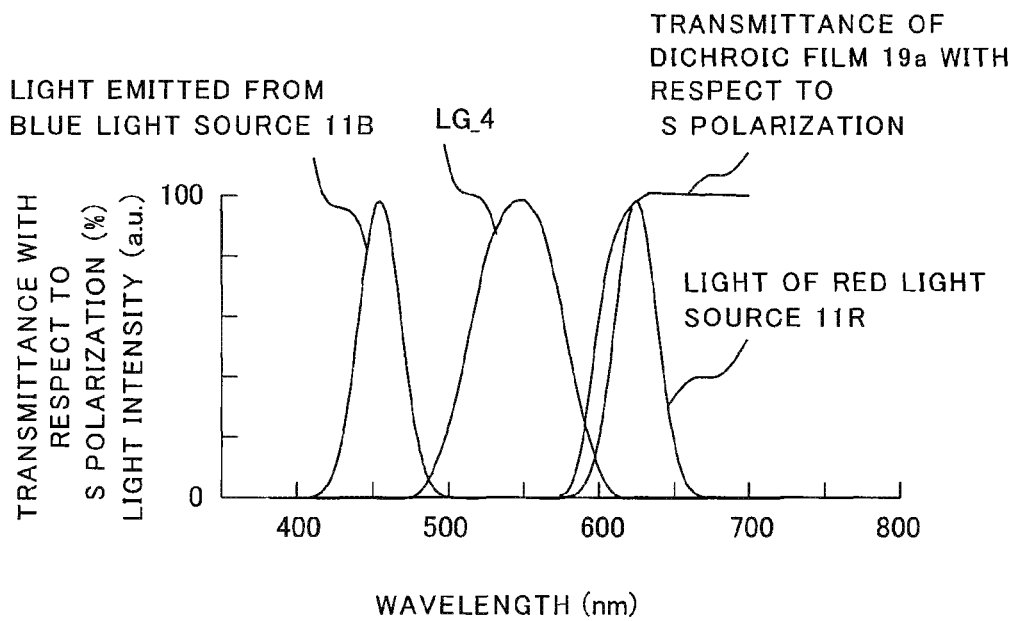
FIG. 10B shows wavelength dependence of the transmittance of a dichroic film and a characteristic diagram with respect to S polarized light showing the spectral distribution of light incident on the first optical path combiner.
Figure 11A:
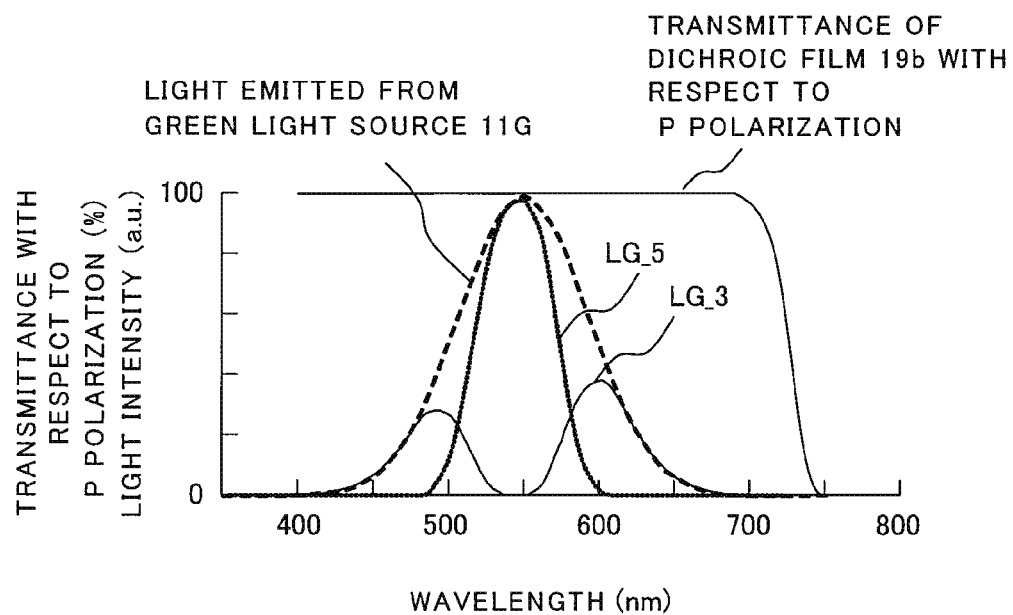
FIG. 11A shows wavelength dependence of the transmittance of a dichroic film and a characteristic diagram with respect to P polarized light showing the spectral distribution of light incident on the first optical path combiner.
Figure 11B:
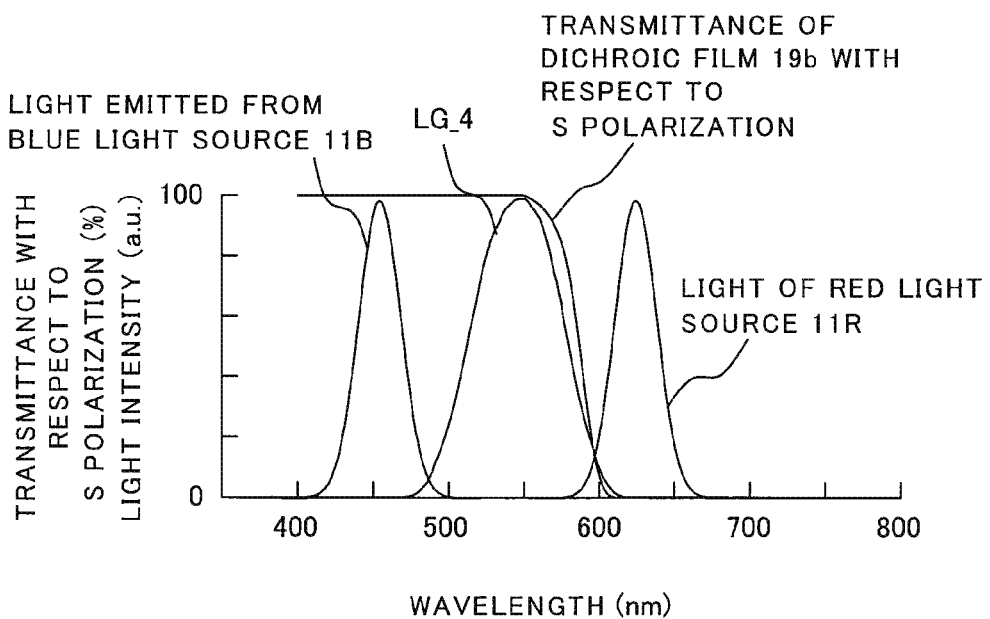
FIG. 11B shows wavelength dependence of the transmittance of a dichroic film and a characteristic diagram with respect to S polarized light showing the spectral distribution of light incident on the first optical path combiner.

FIG. 10A and FIG. 10B show wavelength dependence of the transmittance of a dichroic film 19a and a spectral distribution of light incident on the first optical path combiner 19, and FIGS. 11A and 11B shows wavelength dependence of the transmittance of a dichroic film 19b and a spectral distribution of light incident on the first optical path combiner 19. FIG. 10A and FIG. 11A show a characteristic with respect to light of P polarization, and FIG. 10B and FIG. 11B show a characteristic with respect to light of S polarization.

On the first optical path combiner 19, the light LG_3 and the light LG_5 of P polarization, and the blue light, the light LG_4, and the red light of S polarization are incident.

The dichroic film 19a transmits the light LG_3 of P polarization (polarization component of fourth direction) and the light LG_5 of P polarization (FIG. 10A), and transmits red light of S polarization (polarization component of third direction), and reflects the blue light of S polarization and the light LG_4 of S polarization (FIG. 10B).

On the other hand, the dichroic film 19b transmits the light LG_3 of P polarization and the light LG_5 of P polarization (FIG. 11A), and transmits the blue light of S polarization and the light LG_4 of S polarization, and reflects the red light of S polarization (FIG. 11B).

Therefore as illustrated in FIG. 9, the light LG_3 and the light LG_5 of P polarization are transmitted through the dichroic film 19a and the dichroic film 19b and emitted towards the projection lens 20. In addition, the blue light and the light LG_4 of S polarization are reflected at the dichroic film 19a, and the red light of S polarization is reflected at the dichroic film 19b, and each of them is emitted towards the projection lens 20.

Accordingly, the first optical path combiner 19 can combine rays of light incident on the first optical path combiner 19 almost without any loss. In an example, a dielectric multilayer film, a holographic element, a photonic crystal, or the like can be used as the dichroic film 19a, the dichroic film 19b, which has a characteristic of transmitting light of a specific wavelength band and reflecting light of the other wavelength bands. Note that the dichroic film 19a and the dichroic film 19b are not necessarily arranged to be orthogonal to each other, and may intersect with each other with an angle other than 90 degrees. Moreover, the dichroic film 19a and the dichroic film 19b do not necessarily intersect with each other. In other words, a configuration may be provided by two prisms, one having a dichroic film 19a and another having a dichroic film 19b, as the prism 19B illustrated in FIG. 12.

The projection lens 20 projects the light emitted from the first optical path combiner 19 onto a screen not illustrated in the drawings.

Figure 13:
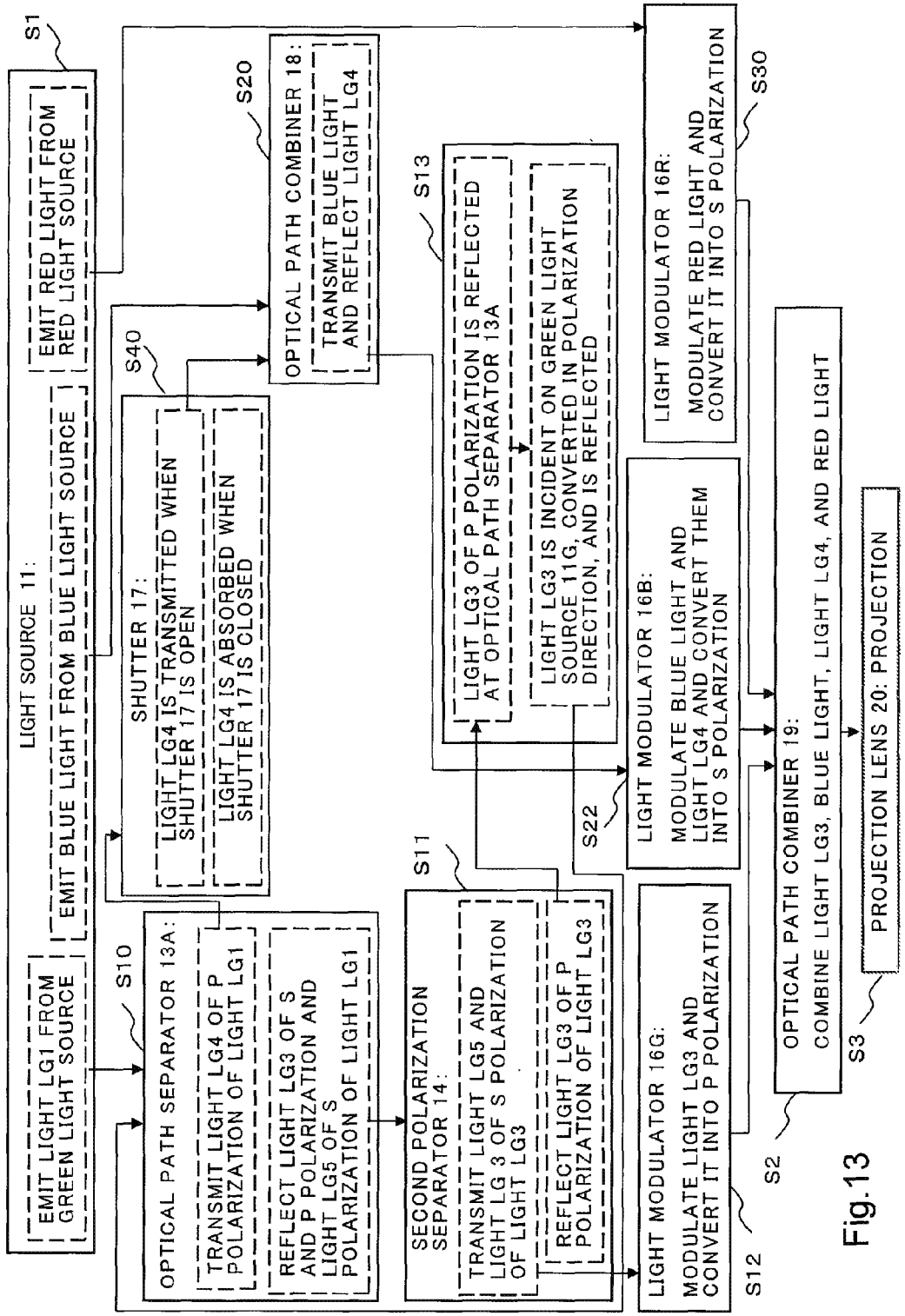

Next, the optical path emitted from each LED is explained below with reference to FIG. 13. FIG. 13 is a flow chart explaining a transmission state of light transmitted through each element such as an optical path separator 13A, a light modulator 16, or the like. Note that in FIG. 13, the optical path is illustrated for each light source 11 for facilitating explanation. That is, Step S1 is a step to emit light from each light source 11. Step S10-Step S12, and Step S40 are respectively steps in which the light emitted from the green light source 11G is incident onto the optical path separator 13A, the second polarization separator 14, the light modulator 16G, and the shutter 17. Step S13 is a step in which the light emitted from the second polarization separator 14 is incident onto the optical path separator 13A and the green light source 11G. Step S20 and Step S22 are steps in which the light rays emitted from the blue light source 11B and the green light source 11G are incident onto the second optical path combiner 18, the light modulator 16B, and the first optical path combiner 19. Step S30 is a step in which the light emitted from the red light source 11R is incident onto the light modulator 16R and the first optical path combiner 19. Step S2 is a step in which the light rays incident on the first optical path combiner 19 are combined and emitted therefrom. Step 3 is a step in which the light incident onto the projection lens 20 is projected on the screen.

Step S1: Light rays are respectively emitted from the red light source 11R, the green light source 11G, and the blue light source 11B.

Step S10: The light LG_1 emitted from the green light source 11G transmits through the lens 12a, is incident on the optical path separator 13A, and is separated into the transmitted light LG_4 and the reflected light LG_3, LG_5 according to the wavelength band and the polarization direction.

Step S11: The light LG_5 incident on the second polarization separator 14 is transmitted through the second polarization separator 14 and incident on the mirror 15. Of the light LG_3 incident on the second polarization separator 14, the light of S polarization component is transmitted and incident on the mirror 15, and the light of P polarization component is reflected.

Step S12: The light incident on the mirror 15 is reflected on the mirror 15 and incident on the light modulator 16G. The light incident on the light modulator 16G is spatially modulated as well as converted from S polarization to P polarization, and incident on the first optical path combiner 19.

Step S13: The light LG_3 of P polarization component reflected at the second polarization separator 14 is reflected at the optical path separator 13A, and incident on the green light source 11G. The light LG_3 incident on the green light source 11G is reflected at the green light source 11G with its polarization direction randomly converted thereon. In other words, the light LG_3 behaves as if it is light emitted from the green light source 11G, and returns from Step S13 to Step S10. Accordingly, the green light reflected at the optical path separator 13A can be effectively utilized.

Step S40: When the shutter 17 is set to transmit the incident light (when the shutter 17 is open), the light LG_4 having transmitted through the optical path separator 13A in Step S10 is transmitted through the shutter 17, and is incident on the second optical path combiner 18. On the other hand, when the shutter 17 is set to absorb the incident light (when the shutter 17 is closed), the light LG_4 having transmitted through the optical path separator 13A in Step S10 is absorbed by the shutter 17.

Step S20: When the shutter 17 is open, the light LG_4 and the blue light emitted from the blue light source 11B are incident on the second optical path combiner 18. As shown in FIG. 8, the second optical path combiner 18 has such a characteristic as transmitting the light of the wavelength band of the blue light and reflecting the light LG_4, and therefore the blue light and the light LG_4 are combined and emitted from the optical path combiner 18. On the other hand, when the shutter 17 is closed, only the blue light is incident on the optical path combiner 18 and emitted from the optical path combiner 18.

Step S22: The light incident on the light modulator 16B is spatially modulated as well as converted from P polarized light to S polarized light, and is incident on the first optical path combiner 19.

Step S30: The red light emitted from the red light source 11R is incident on the light modulator 16R via the lens 12e, 12f, and spatially modulated as well as converted from P polarized light to S polarized light, and is emitted to the first optical path combiner 19.

As explained above, the light LG_5 of P polarization and the light LG_3 of P polarization are incident on the first incident surface 19c of the first optical path combiner 19, the blue light of S polarization and the light LG_4 of S polarization are incident on the second incident surface 19d, and the red light of S polarization is incident on the incident surface 19e.

Step S2: The first optical path combiner 19 combines the light rays incident on the first optical path combiner 19, and emits them from the emission surface 19f towards the projection lens 20.

Step S3: The light emitted from the optical path combiner 19 is projected onto the screen by means of the projection lens 20.

As explained above, in the present exemplary embodiment, the green light emitted from the green light source 11G is separated into the light LG_3 and the light LG_5, and the light LG_4 by means of the optical path separator 13A.

During this process, as illustrated in FIG. 4, the optical path separator 13A is constituted by the bandpass filter 13a and the polarizer 13b, and these bandpass filter 13a and the polarizer 13b have a function to separate each incident light into two. Therefore, even when the optical path separator 13A is constituted solely by the polarizer 13b, it can still separate the incident light into two, and so the bandpass filter 13a apparently seems unnecessary.

However, in the optical path separator 13A that does not have any bandpass filter 13a, the light incident on the second optical path combiner 18 will be the light LG_1 of P polarization and not the light LG_4 of P polarization. As illustrated in FIG. 6, the light LG_1 has a spectral distribution wider than the light LG_4. Accordingly, the quantity of light corresponding to this wide spectral distribution will be lost in the second optical path combiner 18 and the first optical path combiner 19. This phenomenon is explained with reference to FIG. 15.

Figure 15:
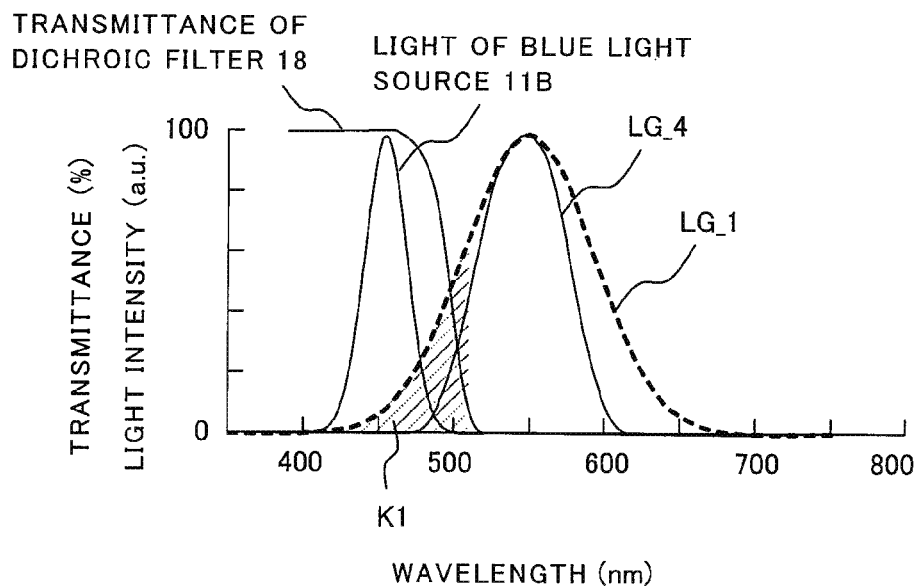
FIG. 15 is a diagram showing wavelength dependence of transmittance of the second optical path combiner with respect to S polarized light and spectral distributions of respective light rays.
Figure 16:
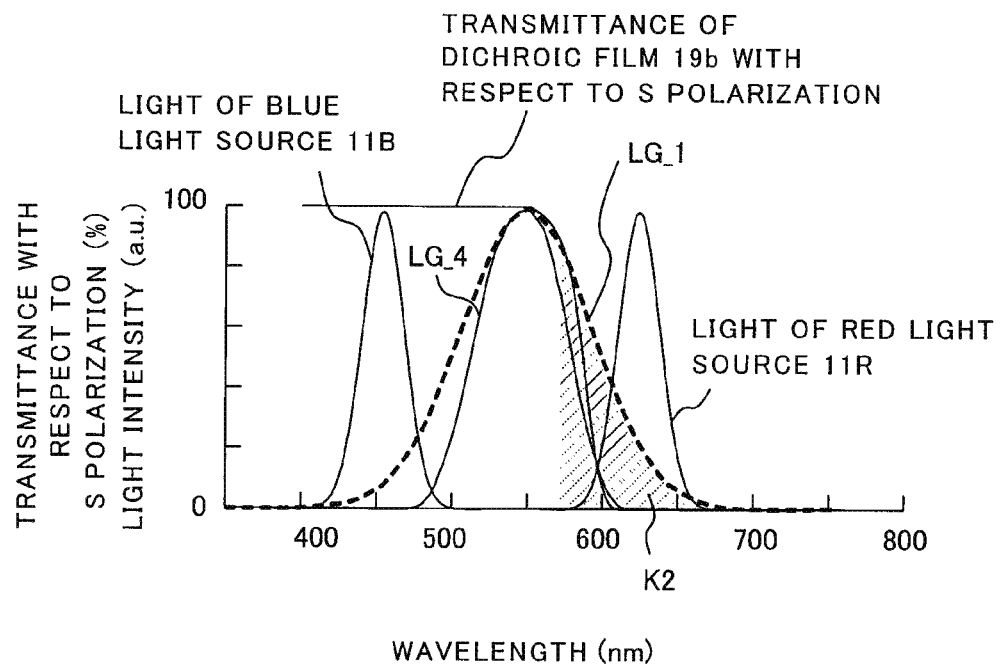
FIG. 16 is a diagram showing wavelength dependence of transmittance of a dichroic film in the first optical path combiner with respect to the S polarized light and spectral distributions of respective light rays.

FIG. 15 is a diagram showing wavelength dependence of transmittance of the second optical path combiner 18 with respect to P polarized light and spectral distributions of respective light rays. FIG. 16 is a diagram showing wavelength dependence of transmittance of a dichroic film 19b in the first optical path combiner 19 with respect to the S polarized light and spectral distributions of respective light rays.

When the shutter 17 is set to transmit the incident light, when the light LG_1 instead of the light LG_4 is incident on the second optical path combiner 18, the light of a shorter wavelength illustrated by the region with slant lines K1 of the light LG_1 overlaps with the blue light (light emitted from blue light source 11B) in spectral distribution as illustrated in FIG. 15, and therefore transmits through the second optical path combiner 18 instead of being reflected at it, as illustrated in FIG. 15. Therefore, the transmitted light will be lost without being combined with the blue light.

When the light LG_1 instead of the light LG_4 is incident on the first optical path combiner 19, the light of a longer wavelength illustrated by the region with slant lines K2 of the light LG_1 overlaps with the red light (light emitted from red light source 11R) in spectral distribution as illustrated in FIG. 16, and therefore is reflected at the dichroic film 19b instead of transmitting through it, as illustrated in FIG. 16. Therefore, the reflected light will be lost without being emitted towards the projection lens 20.

In this way, when the shutter 17 is set to transmit the incident light and when the bandpass filter 13a is not provided, of the light emitted from the green light source 11G, the light of a shorter wavelength and a longer wavelength having transmitted through the polarizer 13b cannot be combined with other light, which reduces the utilization efficiency of the emitted light.

However, by configuring the optical path separator 13A by the bandpass filter 13a and the polarizer 13b as in the present exemplary embodiment, of the light emitted from the green light source 11G, the light rays LG_3 in a shorter wavelength and a longer wavelength are reflected at the bandpass filter 13a, and are incident on the first optical path combiner 19 as the light of S polarization. Therefore, such a problem that these light rays are lost in the second optical path combiner 18 and the first optical path combiner 19 will not be caused.

In addition, by separating the light emitted from the single green light source 11G into two, and mixing one light ray with the light emitted from the blue light source 11B, the light quantity of the green light incident on the first optical path combiner 19 is increased. For this reason, the light quantity of the green light can be increased without degrading the intensity of the red light and the blue light.

The above example assumes a case in which the shutter 17 is open and the incident light is designed to be transmitted. On the other hand, when the shutter 17 is closed, the incident light is absorbed. That is, the light LG_1 emitted from the green light source 11G is separated into two directions by means of the optical path separator 13A, and one of the light rays LG_4 is incident on the shutter 17, and absorbed by this shutter 17.

Therefore, the second optical path combiner 18 does not combine light, and the light incident on the first optical path combiner 19 after transmitting through the light modulator 16B will be solely the light emitted from the blue light source 11B (blue light). Therefore, the emitted light quantity of the projection display apparatus 2A will be smaller than the emitted light quantity when the shutter 17 is open.

When the shutter 17 is open, as illustrated in FIG. 8, the light incident on the first optical path combiner 19 after transmitting through the light modulator 16B is light resulting from combining the light LG_4 having an intensity peak between wavelengths 500 nm and 600 nm and the light emitted from the blue light source 11B having an intensity peak between wavelengths 400 nm and 500 nm. Due to this combined light, the light will be closer to white light than the light emitted from the blue light source 11B on the chromaticity coordinate, and the color reproduction range of the light emitted from the projection display apparatus 2A will be narrow.

However when the shutter 17 is closed, the light incident on the first optical path combiner 19 after transmitting through the light modulator 16B is only blue light, and therefore the chromaticity range of the light emitted from the projection display apparatus 2A will be wider than the chromaticity range when the shutter 17 is open. In other words, by opening and closing the shutter 17, it is possible to switch between narrowing the color reproduction range by increasing the output of the projection display apparatus 2A and widening the color reproduction range by decreasing the output.

Figure 14:
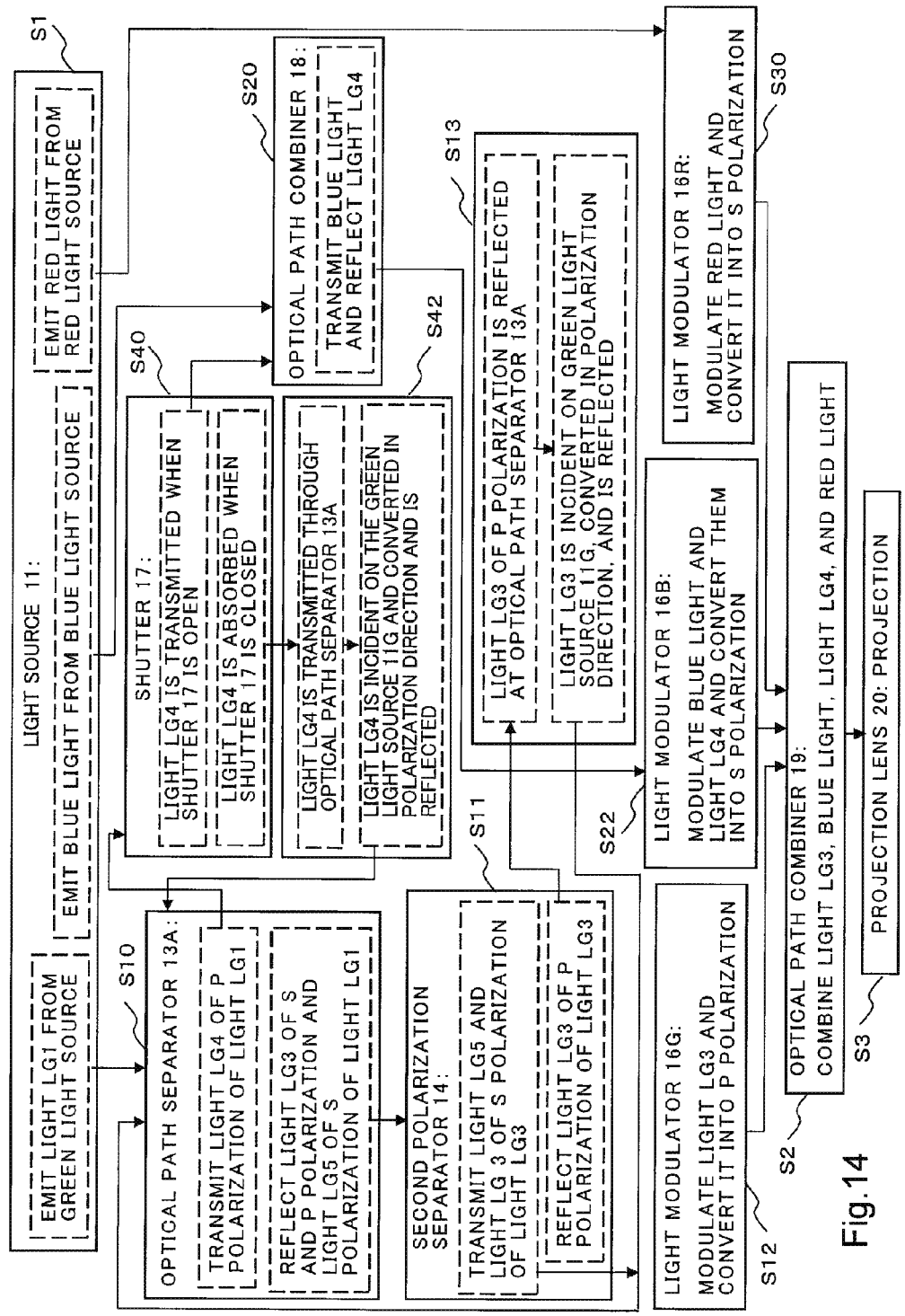

Note that it is also possible to adopt a configuration in which the mirror instead of the absorption plate is taken in and out as the shutter 17, to switch between whether to transmit or reflect the incident light. FIG. 14 shows a flowchart explaining a transmission state of light transmitted through each element such as an optical path separator 13A, a light modulator 16, or the like, when the mirror is used as the shutter 17. The flow chart of FIG. 14 is the same as the flowchart illustrated in FIG. 13, except including Step S41 instead of Step S40 of the flow chart of FIG. 13 and including Step S42.

Step S41: If the configuration is such as switching whether to transmit or reflect incident light by the shutter 17 taking in and out the mirror on the optical path, and the shutter 17 is designed to transmit the incident light (when the shutter 17 is open), the light LG_4 having transmitted through the optical path separator 13A in Step S10 is transmitted through the shutter 17, and is incident on the second optical path combiner 18. On the other hand, when the shutter 17 is set to reflect the incident light (when the shutter 17 is closed), the light LG_4 having transmitted through the optical path separator 13A in Step S10 is reflected at the shutter 17 and incident on the optical path separator 13A.

Step S42: The light LG_4 reflected at the shutter 17 and incident on the optical path separator 13A transmits through the optical path separator 13A and is incident on the green light source 11G. The light LG_4 incident on the green light source 11G is reflected at the green light source 11G with its polarization direction randomly converted in the green light source 11G. In other words, the light LG_4 behaves as if it is light emitted from the green light source 11G, and returns from Step S42 to Step S10.

By using a mirror as the shutter 17 in this manner, the light quantity of the light incident on the first optical path combiner 19 after transmitting through the light modulator 16G will be increased compared to the case in which an absorption plate is used. When a mirror is used as the shutter 17, the fourth wavelength band may be set to be narrow or to be 0. In other words, the bandpass filter 13a may not be provided and the light LG_3 may not be generated. Since the light LG_4 including light rays of a shorter wavelength and a longer wavelength of the light emitted from the green light source 11G is incident on the green light source 11G while the shutter 17 operates as a mirror, the light quantity of light incident on the first optical path combiner 19 can be increased. In addition, a half mirror may be used as the mirror of the shutter 17. By using a half mirror, it is possible to arbitrarily set the relation between the color reproduction range and the light output.

Note that only the lens 12a is provided between the green light source 11G and the optical path separator 13A in the above-explained configuration, a ¼ wave plate may be provided therebetween.

A ¼ wave plate has a function of giving a phase difference of 90 degrees to the transmitted light. Therefore, of the light LG_3 of P polarization reflected at the second polarization separator 14, the light specular reflected at the green light source 11G without randomly converted in polarization direction is transmitted through this ¼ wave plate twice and given 180 degrees of phase difference while being incident on the optical path separator 13A again, thereby being converted in light of S polarization. By doing so, the number of times of reflection of the light LG_3 at the polarization separator 14 and the green light source 11G can be reduced, as well as restraining the absorption loss in the optical path separator 13A, the green light source 11G, and the polarization separator 14, and the surface reflection during passage through the lens 12a and the light quantity loss due to vignetting.

Note that a wire grid polarizer made of metal such as aluminum, silver, gold, or the like, a photonic crystal, a dielectric multilayer film, or the like may be used as the polarizer 13b, the polarizers 16Ra, 16Ga, 16Ba, the analyzers 16Rc, 16Gc, 16Bc, and the second polarization separator 14. In addition, an absorptive polarizer made of polymer may be used as the analyzers 16Rc, 16Gc, 16Bc.

As the bandpass filter 13a, the second optical path combiner 18, the dichroic film 19a, the dichroic film 19b, elements which use a dielectric multilayer film, a holographic element, a photonic crystal, or the like and which have a characteristic of transmitting light of a specific wavelength band and reflecting light of the other wavelength bands can be used.

Further, as illustrated in FIG. 4, the optical path separator 13A has a configuration in which the bandpass filter 13a and the polarizer 13b are sequentially arranged from the incident light side.

However, the present invention is not limited to such an arrangement, and the reversed arrangement may be possible. That is, it is possible to set the optical path separator 13A so that the light is incident on the bandpass filter 13a after incident on the polarizer 13b.

Figure 17:
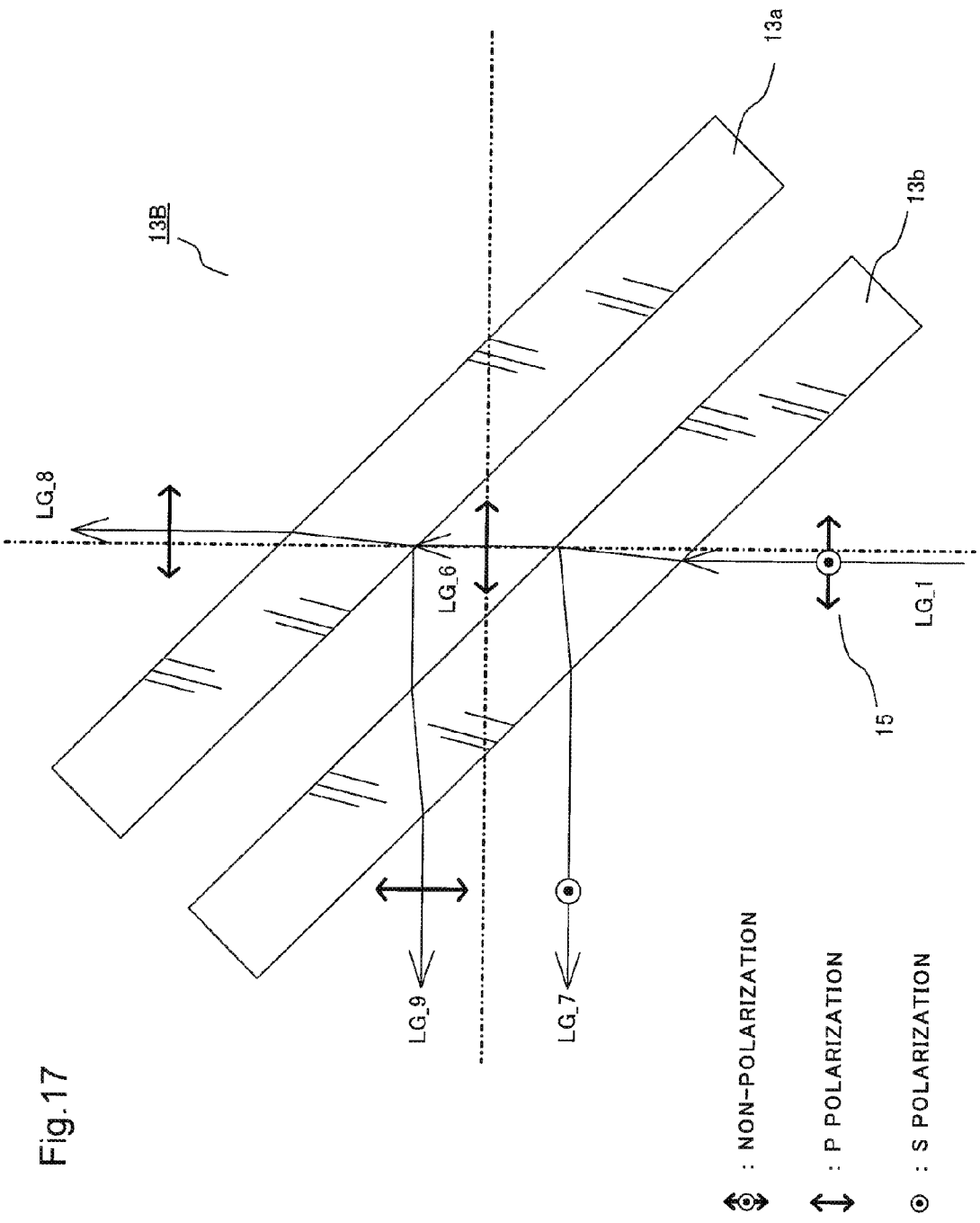
FIG. 17 is a block diagram of an optical path separator in which the positions of the bandpass filter and the polarizer are reversed.

FIG. 17 is a block diagram of an optical path separator 13B in which the positions of the bandpass filter 13a and the polarizer 13b are reversed. The light LG_7 (fourth light) of S polarization component of the light LG_1 (first light) incident on the optical path separator 13B is reflected at the polarizer 13b. On the other hand, the light LG_6 of P polarization component transmits through the polarizer 13b, to be incident on the bandpass filter 13a.

Out of the light LG_6, the light LG_8 in the vicinity of the wavelength of 550 nm (fifth light) transmits through the bandpass filter 13a, but the light LG_9 not in the vicinity of the wavelength of 550 nm (fourth light) is reflected at the bandpass filter 13a, and transmitted through the polarizer 13b, to be emitted from the optical path separator 13B.

Eventually, in the optical path separator 13B, of the incident light LG_1, the light of S polarization LG_7 and the light of P polarization LG_9 are reflected, and the light of P polarization LG_8 is transmitted.

Note that each of the light LG_4 transmitted through the optical path separator 13A illustrated in FIG. 4 and the light LG_8 transmitted through the optical path separator 13B illustrated in FIG. 17 is transmitted through each of the bandpass filter 13a and the polarizer 13b once, and the polarization direction and the spectral distribution have the same distribution. The light reflected at the optical path separator 13A illustrated in FIG. 4 and the light reflected at the optical path separator 13B illustrated in FIG. 17 are incident on the bandpass filter 13a a different number of times from each other, and therefore are slightly different in the spectral distribution, but have substantially the same polarization state and spectral distribution. Therefore, regardless of the optical path separator 13A or the optical path separator 13B, the projection display apparatus 2A as a whole can achieve the same functional effect.

Second Exemplary Embodiment

Figure 18:
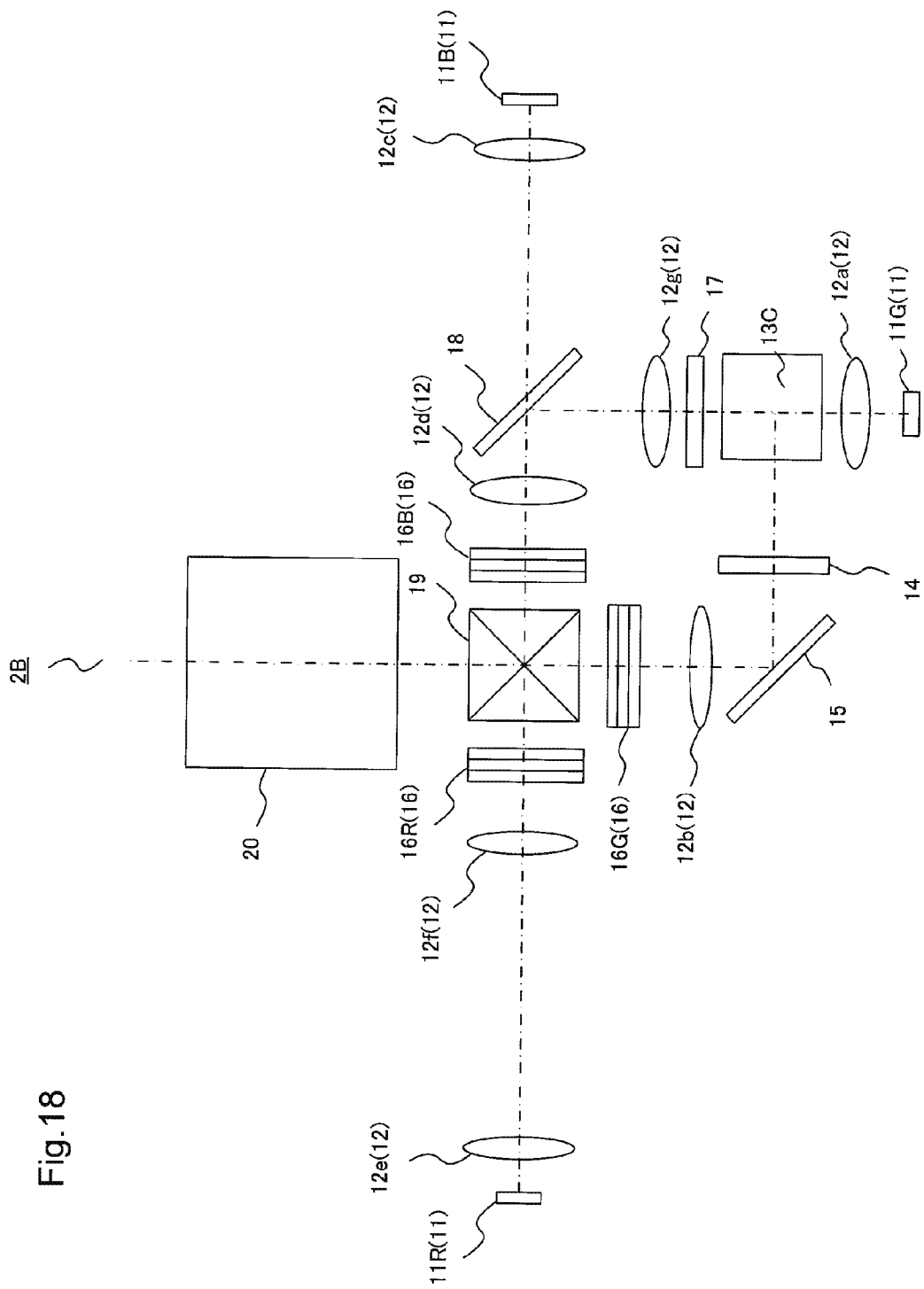
FIG. 18 is a block diagram of a projection display apparatus according to a second exemplary embodiment according to the present invention.

Next, the second exemplary embodiment of the present invention is explained. Note that the configurations same as those of the first exemplary embodiment are assigned the same reference numerals, and their explanation is omitted as necessary. FIG. 18 is a block diagram of a projection display apparatus 2B according to the second exemplary embodiment.

The projection display apparatus 2B has an optical path separator 13C instead of the optical path separator 13A of the projection display apparatus 2A illustrated in FIG. 1.

Figure 19:
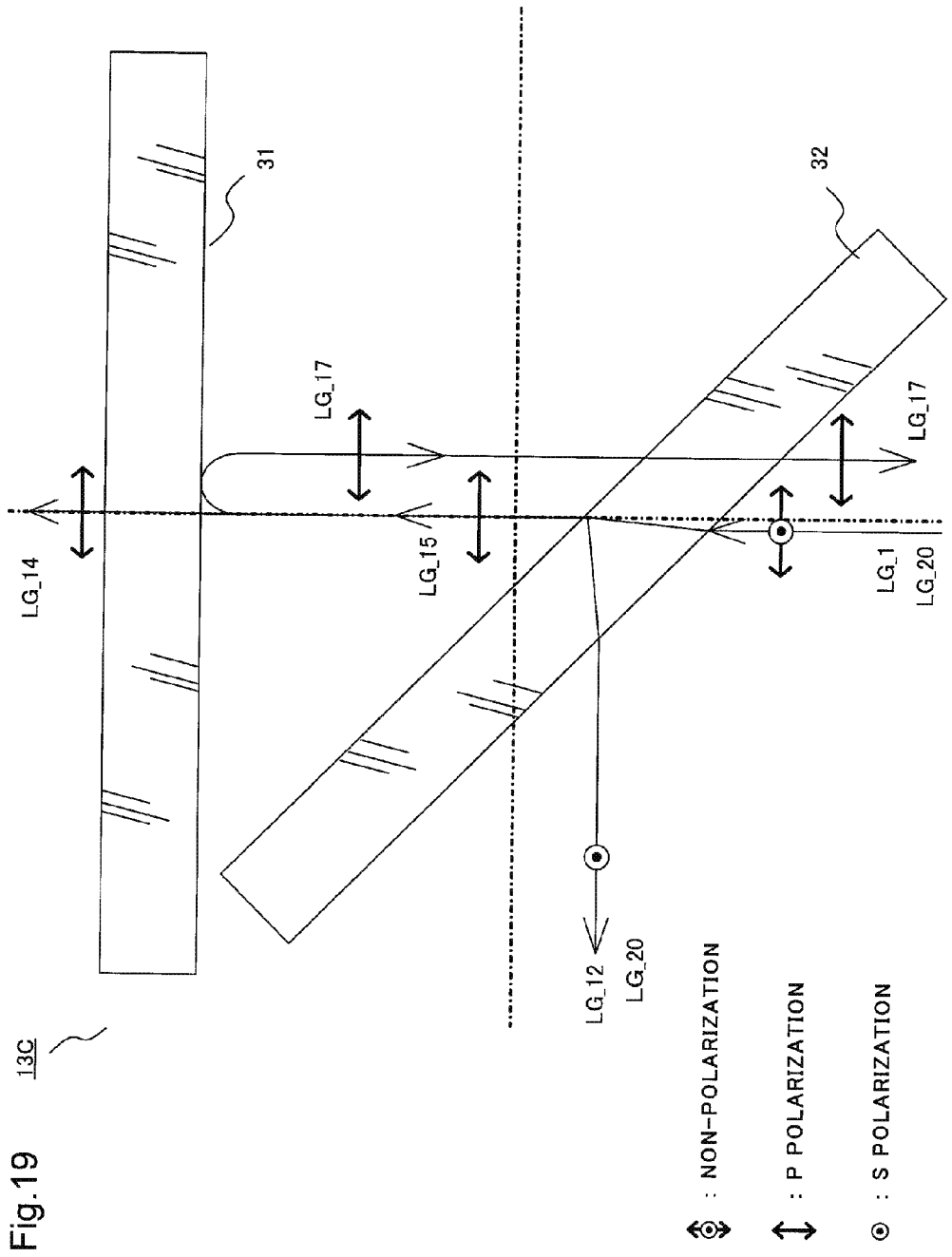
FIG. 19 is a block diagram of an optical path separator.
Figure 20:
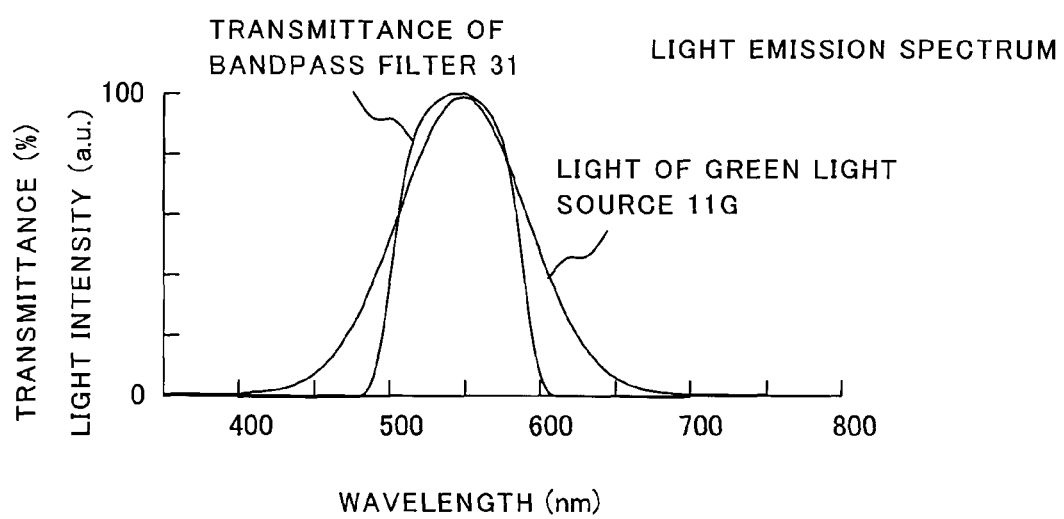
FIG. 20 shows wavelength dependence of the transmittance of a bandpass filter and a spectral distribution diagram of a green light source.

As illustrated in FIG. 19, this optical path separator 13C is constituted by the bandpass filter 31 and the polarizer 32, and has such wavelength dependence of the transmittance of a bandpass filter 31 and a spectral distribution diagram of a green light source 11G as illustrated in FIG. 20. This bandpass filter 31 transmits light in the vicinity of the wavelength of 550 nm, and reflects off light of the other wavelengths. The light of wavelength band to be transmitted is set to be narrower than the spectral distribution of the green light source 11G.

The polarizer 32 transmits the P polarization component, and reflects the S polarization component.

Accordingly, of the light LG_1 (first light) incident on the optical path separator 13C from the green light source 11G, the light LG_12 of S polarization component (fourth light) is reflected at the polarizer 32, and the light LG_15 of P polarization component transmits through the polarizer 32 and is incident on the bandpass filter 31. Of the light LG_15, the light LG_14 in the vicinity of the wavelength of 550 nm (fifth light) transmits through the bandpass filter 31, and the light LG_17 not in the vicinity of the wavelength of 550 nm is reflected at the bandpass filter 31, transmitted through the polarizer 32, and returns towards the green light source 11G.

The light LG_17 is reflected at the green light source 11G with its polarization direction randomly converted, transmits through the lens 12a again, and is incident on the optical path separator 13C. Of the light LG_17 incident on the optical path separator 13C, the light LG_20 of S polarization component (fourth light) is reflected at the polarizer 32.

Finally in the optical path separator 13C, of the incident light, the light rays of S polarization LG_12 and LG_20 are reflected, and the light of P polarization LG_14 is transmitted.

Figure 21:
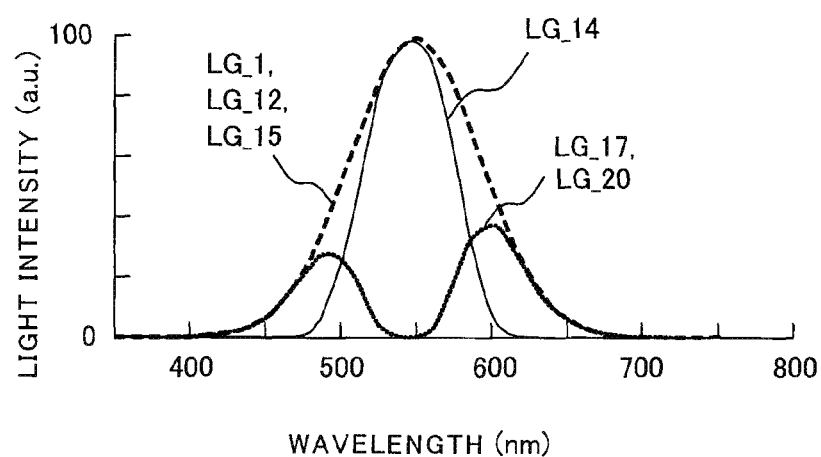
FIG. 21 is a spectral distribution diagram of incident light and emitted light of the optical path separator.

FIG. 21 shows a spectral distribution of light LG_1 through LG_20. The spectral distributions of the light LG_1, LG_12, LG_15 are the same as the spectral distribution of the green light source 11G. As opposed to this, the spectral distribution of the light LG_14 has its peak in the vicinity of the wavelength of 550 nm, and is narrower in wavelength band than the spectral distribution of the light LG_1.

In addition, the spectral distributions of the light LG_17, LG_20 have two peaks in the shorter wavelength side and the longer wavelength side.

When the bandpass filter 13a is set to slant with respect to the optical axis for example as in the optical path separator 13A, 13B, the incident angle of the light onto the bandpass filter 13a will be around 45 degrees, which generates polarization dependence to the transmittance of the bandpass filter 13a. However, when the bandpass filter 31 of the optical path separator 13C is set to be vertical to the optical axis, the incident angle of the light incident on this bandpass filter 31 will be substantially 0 degree, which reduces the polarization dependence of the transmittance of the bandpass filter 31. This facilitates designing of the bandpass filter 31.

Note that optical elements such as a lens may be provided between the polarizer 32 and the bandpass filter 31 in the optical path separator 13C.

Part or all of the exemplary embodiments can also be described as follows, however should not be limited to as below.

<Supplementary Note 1>

A projection display apparatus generating and projecting light of a plurality of wavelength bands, including: a first light source that emits first light of a first wavelength band; an optical path separator that separates the first light into fourth light and fifth light having different optical paths from each other; and a first optical path combiner that combines the fourth light and the fifth light, where the fourth light includes light of a fourth wavelength band being a predetermined band in the first wavelength band and light having a polarization component in a first direction being a predetermined polarization direction in a fifth wavelength band being a band other than the fourth wavelength band in the first wavelength band, and the fifth light is light having a polarization component in a second direction orthogonal to the first direction in the fifth wavelength band.

<Supplementary Note 2>

The projection display apparatus according to Supplementary Note 1, where the optical path separator includes: a wavelength separator that transmits, of incident light, light of at least the fifth wavelength band, and reflects light of the fourth wavelength band; and a first polarization separator that transmits, of the incident light, light having the polarization component in the first direction, and reflects light having the polarization component in the second direction.
<Supplementary Note 3>
The projection display apparatus according to Supplementary Note 1 or 2, including:
a second polarization separator that is provided in an optical path of the fourth light between the optical path separator and the first optical path combiner, where
the second polarization separator transmits, of the incident fourth light, light having the polarization component in the first direction, and reflects the light having the polarization component in the second direction.
<Supplementary Note 4>
The projection display apparatus according to Supplementary Note 3, including:
a ¼ wave plate that is provided between the second polarization separator and the first light source.
<Supplementary Note 5>
The projection display apparatus according to any one of Supplementary Notes 1 to 4, including:
a second light source that emits second light having a second wavelength band;
a third light source that emits third light having a third wavelength band; and
a second optical path combiner that is provided in an optical path of the fifth light between the first optical path combiner and the second light source, and combines the second light and the fifth light.
<Supplementary Note 6>
The projection display apparatus according to Supplementary Note 5, wherein
the first optical path combiner includes:
a first incident surface on which the fourth light is incident;
a second incident surface on which the second light and the fifth light are incident;
a third incident surface on which the third light is incident; and
an emission surface from which the second light to the fifth light having been incident are emitted.
<Supplementary Note 7>
The projection display apparatus according to Supplementary Note 6, wherein
the first optical path combiner includes:
a first film that reflects light having a polarization component in a third direction, at least out of the light of the second wavelength band or the light of the fifth wavelength band, and transmits light having a polarization component in a fourth direction orthogonal to the third direction, at least out of the light of the first wavelength band; and
a second film that reflects light having the polarization component in the third direction, at least out of the light of the third wavelength band, and transmits light having the polarization component in the fourth direction, at least out of the light of the first wavelength band.
<Supplementary Note 8>
The projection display apparatus according to Supplementary Note 6 or 7, including:
a first light modulator to a third light modulator that correspond to the first incident surface to the third incident surface of the first optical path combiner respectively, and modulate light incident on the respective incident surfaces, where
the first light modulator to the third light modulator are formed by arranging a polarizer, a polarization modulating element, and an analyzer from the side of incident light.
<Supplementary Note 9>
The projection display apparatus according to Supplementary Note 8, wherein
the polarizer of the first light modulator transmits, of the incident fourth light, light having the polarization component in the first direction, and reflects light having the polarization component in the second direction.
<Supplementary Note 10>
The projection display apparatus according to any one of Supplementary Notes 5 to 9, where
the first light has a peak in light intensity in wavelengths between 500 nm and 600 nm,
the second light has a peak in light intensity in wavelengths between 400 nm and 500 nm, and
the third light has a peak in light intensity in wavelengths between 600 nm and 700 nm.
<Supplementary Note 11>
The projection display apparatus according to any one of Supplementary Notes 1 to 10, where
the first light source includes:
the fourth light source that emits sixth light a peak in light intensity in wavelengths between 300 nm and 500 nm; and
a phosphor that absorbs the sixth light and emits the first light.
<Supplementary Note 12>
The projection display apparatus according to any one of Supplementary Notes 1 to 11, including:
a first blocker that switches whether or not to transmit incident light, between the optical path separator and the second optical path combiner.
<Supplementary Note 13>
The projection display apparatus according to any one of Supplementary Notes 1 to 11, including:
a second blocker that switches whether to transmit or reflect incident light, between the optical path separator and the second optical path combiner.
<Supplementary Note 14>
The projection display apparatus according to any one of Supplementary Notes 1 to 11, including:
a second blocker that switches whether to transmit incident light, or to transmit a part of the incident light and reflect a part of the incident light, between the optical path separator and the second optical path combiner.
<Supplementary Note 15>
A projection light generating method generating and projecting light of a plurality of wavelength bands, including:
a first light emitting step of emitting first light of a first wavelength band;
an optical path separating step of separating the first light into fourth light and fifth light having different optical paths from each other; and
a first optical path combining step of combining the fourth light and the fifth light, where
the fourth light includes light of a fourth wavelength band being a predetermined band in the first wavelength band and light having a polarization component in a first direction being a predetermined polarization direction in a fifth wavelength band being a band other than the fourth wavelength band in the first wavelength band, and
the fifth light is light having a polarization component in a second direction orthogonal to the first direction in the fifth wavelength band.
<Supplementary Note 16>
The projection light generating method according to Supplementary Note 15, where
the optical path separating step includes:
a wavelength separating step of transmitting, of incident light, light of at least the fifth wavelength band, and reflecting light of the fourth wavelength band; and a first polarization separating step of transmitting, of the incident light, light having the polarization component in the first direction, and reflecting light having the polarization component in the second direction.

<Supplementary Note 17>

The projection light generating method according to Supplementary Note 15 or 16, including:

a second polarization separating step that is provided in an optical path of the fourth light between the optical path separating step and the first optical path combining step, where the second polarization separating step transmits, of the incident fourth light, light having the polarization component in the first direction, and reflects the light having the polarization component in the second direction.

<Supplementary Note 18>

The projection light generating method according to any one of Supplementary Notes 15 to 17, including a second light emitting step of emitting second light having a second wavelength band;

a third light emitting step of emitting third light having a third wavelength band; and a second optical path combining step of combining the second light and the fifth light, being provided between the first optical path combining step and the second light emitting step.

<Supplementary Note 19>

The projection light generating method according to Supplementary Note 18, where the first optical path combining step includes:

a first film reflecting light having a polarization component in a third direction, at least out of the light of the second wavelength band or the light of the fifth wavelength band, and transmitting light having a polarization component in a fourth direction orthogonal to the third direction, at least out of the light of the first wavelength band; and a second film reflecting light having the polarization component in the third direction, at least out of the light of the third wavelength band, and transmitting light having the polarization component in the fourth direction, at least out of the light of the first wavelength band.

<Supplementary Note 20>

The projection light generating method according to any one of Supplementary Notes 15 to 19, including:

a first blocking step of switching whether or not to transmit the fifth light separated in the optical path separating step.

<Supplementary Note 21>

The projection light generating method according to any one of Supplementary Notes 15 to 19, including:

a second blocking step of switching whether to transmit or reflect the fifth light separated in the optical path separating step.

<Supplementary Note 22>

The projection light generating method according to any one of Supplementary Notes 15 to 19, including:

a third blocking step of switching whether to transmit the fifth light separated in the optical path separating step, or to transmit a part of the fifth light and reflect a part of the fifth light.

This application claims priority from Japanese Patent Application No. 2012-172192, filed on Aug. 2, 2012, the contents of which are hereby incorporated by reference in their entirety as if fully set forth herein.

REFERENCE SIGNS LIST 2A, 2B projection display apparatus
11 light source
11G green light source
11B blue light source
11R red light source
12(12a-12g) lens
13A-13C optical path separator
13a bandpass filter
13b polarizer
14 second polarization separator
15 mirror
16(16R, 16B, 16G) light modulator
16Ra, 16Ga, 16Ba polarizer
16Rb, 16Gb, 16Bb liquid crystal cell
16Rc, 16Gc, 16Bc analyzer
17 shutter
18 second optical path combiner
19, 19B first optical path combiner
19a dichroic film
19b dichroic film
19c first incident surface
19d second incident surface
19e third incident surface
19f emission surface
projection lens
31 bandpass filter
32 polarizer

What is claimed is:

1. A projection display apparatus generating and projecting light of a plurality of wavelength bands, comprising:

a first light source that emits first light of a first wavelength band;

an optical path separator that separates the first light into second light and third light having different optical paths from each other; and a first optical path combiner that combines the second light and the third light, wherein the second light includes light of a second wavelength band being a predetermined band in the first wavelength band and light having a polarization component in a first direction being a predetermined polarization direction in a third wavelength band being a band other than the second wavelength band in the first wavelength band, and the third light is light having a polarization component in a second direction orthogonal to the first direction in the third wavelength band, wherein the optical path separator includes:

a wavelength separator that transmits, of incident light, light of at least the fifth wavelength band, and reflects light of the fourth wavelength band; and a first polarization separator that transmits, of the incident light, light having the polarization component in the first direction, and reflects light having the polarization component in the second direction; and the apparatus further comprises:

a second polarization separator that is provided in an optical path of the fourth light between the optical path separator and the first optical path combiner, wherein the second polarization separator transmits, of the incident fourth light, light having the polarization component in the first direction, and reflects the light having the polarization component in the second direction.

2. The projection display apparatus according to claim 1, further comprising:

a ¼ wavelength plate that is provided between the second polarization separator and the first light source.

3. The projection display apparatus according to claim 2, further comprising:
a second light source that emits second light having a second wavelength band;
a third light source that emits third light having a third wavelength band; and
a second optical path combiner that is provided in an optical path of the fifth light between the first optical path combiner and the second light source, and combines the second light and the fifth light.

4. The projection display apparatus according to claim 3, wherein
the first optical path combiner includes:
a first incident surface on which the fourth light is incident;
a second incident surface on which the second light and the fifth light are incident;
a third incident surface on which the third light is incident; and
an emission surface from which the second light to the fifth light having been incident are emitted.

5. The projection display apparatus according to claim 4, wherein
the first optical path combiner includes:
a first film that reflects light having a polarization component in a third direction, at least out of the light of the second wavelength band or the light of the fifth wavelength band, and transmits light having a polarization component in a fourth direction orthogonal to the third direction, at least out of the light of the first wavelength band; and
a second film that reflects light having the polarization component in the third direction, at least out of the light of the third wavelength band, and transmits light having the polarization component in the fourth direction, at least out of the light of the first wavelength band.

6. The projection display apparatus according to claim 5, further comprising:
a first light modulator to a third light modulator that correspond to the first incident surface to the third incident surface of the first optical path combiner respectively, and modulate light incident on the respective incident surfaces, wherein
the first light modulator to the third light modulator are formed by arranging a polarizer, a polarization modulating element, and an analyzer from the side of incident light.

7. The projection display apparatus according to claim 6, wherein
the polarizer of the first light modulator transmits, of the incident fourth light, light having the polarization component in the first direction, and reflects light having the polarization component in the second direction.

8. The projection display apparatus according to claim 7, wherein
the first light has a peak in light intensity in wavelengths between 500 nm and 600 nm,
the second light has a peak in light intensity in wavelengths between 400 nm and 500 nm, and
the third light has a peak in light intensity in wavelengths between 600 nm and 700 nm.

9. The projection display apparatus according to claim 8, wherein
the first light source includes:
the fourth light source that emits sixth light a peak in light intensity in wavelengths between 300 nm and 500 nm; and
a phosphor that absorbs the sixth light and emits the first light.

10. The projection display apparatus according to claim 9, further comprising:
a first blocker that switches whether or not to transmit incident light, between the optical path separator and the second optical path combiner.

11. The projection display apparatus according to claim 9, further comprising:
a second blocker that switches whether to transmit or reflect incident light, between the optical path separator and the second optical path combiner.

12. The projection display apparatus according to claim 9, further comprising:
a second blocker that switches whether to transmit incident light, or to transmit a part of the incident light and reflect a part of the incident light, between the optical path separator and the second optical path combiner.

13. A projection light generating method generating and projecting light of a plurality of wavelength bands, comprising:
emitting first light of a first wavelength band by a first light source;
separating the first light into second light and third light having different optical paths from each other, by an optical path separator; and
combining the second light and the third light, by a first optical path combiner, wherein
the second light includes light of a second wavelength band being a predetermined band in the first wavelength band and light having a polarization component in a first direction being a predetermined polarization direction in a third wavelength band being a band other than the second wavelength band in the first wavelength band, and
the third light is light having a polarization component in a second direction orthogonal to the first direction in the third wavelength band,
wherein:
transmitting, of incident light, light of at least the fifth wavelength band, and reflecting light of the fourth wavelength band, by a wavelength separator; and
transmitting, of the incident light, light having the polarization component in the first direction, and reflecting light having the polarization component in the second direction, by a first polarization separator; the method further comprising:
transmitting, of the incident fourth light, light having the polarization component in the first direction, and reflecting the light having the polarization component in the second direction, by a second polarization separator that is provided in an optical path of the fourth light between the optical path separator and the first optical path combiner.

14. The projection light generating method according to claim 13, further comprising:
emitting second light having a second wavelength band, by a second light source;
emitting third light having a third wavelength band, by a third light source; and
combining the second light and the fifth light, by a second optical path combiner that is provided between the first optical path combiner and the second light source.

15. The projection light generating method according to claim 14, further comprising:
by a first film, reflecting light having a polarization component in a third direction, at least out of the light of the second wavelength band or the light of the fifth wavelength band, and transmitting light having a polarization component in a fourth direction orthogonal to the third direction, at least out of the light of the first wavelength band; and by a second film, reflecting light having the polarization component in the third direction, at least out of the light of the third wavelength band, and transmitting light having the polarization component in the fourth direction, at least out of the light of the first wavelength band.

16. The projection light generating method according to claim 15, further comprising:

by a first blocker, switching whether or not to transmit the fifth light separated in the optical path separator.

* * * * *